US010756863B2

(12) United States Patent
Nammi

(10) Patent No.: US 10,756,863 B2
(45) Date of Patent: Aug. 25, 2020

(54) TRANSMITTING REFERENCE SIGNALS IN 5G OR OTHER NEXT GENERATION COMMUNICATION SYSTEMS

(71) Applicant: AT&T INTELLECTUAL PROPERTY I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 23 days.

(21) Appl. No.: 16/058,805

(22) Filed: Aug. 8, 2018

(65) Prior Publication Data
US 2019/0349159 A1 Nov. 14, 2019

Related U.S. Application Data

(60) Provisional application No. 62/670,510, filed on May 11, 2018.

(51) Int. Cl.
H04W 4/00 (2018.01)
H04L 5/00 (2006.01)
(Continued)

(52) U.S. Cl.
CPC ......... *H04L 5/0048* (2013.01); *H04B 7/0626* (2013.01); *H04L 1/0071* (2013.01);
(Continued)

(58) Field of Classification Search
CPC .... H04L 5/0048; H04L 1/0071; H04W 72/08; H04W 72/042; H04B 7/0626; H04B 7/0413
(Continued)

(56) References Cited

U.S. PATENT DOCUMENTS 8,213,943 B2 * 7/2012 Malladi ................. H04B 1/713
370/278
8,340,605 B2 12/2012 Hou et al.
(Continued)

FOREIGN PATENT DOCUMENTS

EP 2742733 A1 6/2014
WO 2008048630 A3 4/2008
(Continued)

OTHER PUBLICATIONS

Tomasin, et al. "Iterative interference cancellation and channel estimation for mobile OFDM" IEEE Transactions on Wireless Communications 4.1 (2005): 238-245.
(Continued)

*Primary Examiner* — Chuong T Ho
(74) *Attorney, Agent, or Firm* — Amin, Turocy & Watson, LLP

(57) ABSTRACT

Techniques for transmitting reference signals (RSs) having respective signal patterns in the coding chain to improve performance of multiple input, multiple output (MIMO) communication systems are presented. For downlink transmissions, an RS management component (RSMC) of a network node can determine a first resource element (RE) pattern for RSs of a first cell and a second RE pattern for RSs of a second cell in the time, frequency, or code domain RSMC can utilize an adaptive interleaver in the coding chain to improve performance of MIMO systems. RSMC can facilitate configuring user equipment (UE) about the interleaver at the RE domain or as part of virtual resource block (VRB)-to-physical resource block (PRB) domain. RSMC can thereby reduce interference on RSs from other co-channel RSs, thereby improving channel estimation performance for channel-state-information estimation and data
(Continued)

detection by the UE, and achieving significant gains in link and system throughputs.

20 Claims, 14 Drawing Sheets

(51) Int. Cl.
  *H04B 7/06* (2006.01)
  *H04L 1/00* (2006.01)
  *H04W 72/08* (2009.01)
  *H04W 72/04* (2009.01)
  *H04B 7/0413* (2017.01)

(52) U.S. Cl.
  CPC ......... *H04W 72/042* (2013.01); *H04W 72/08* (2013.01); *H04B 7/0413* (2013.01)

(58) Field of Classification Search
  USPC .................................................. 370/329, 330
  See application file for complete search history.

(56) References Cited

U.S. PATENT DOCUMENTS

| | | | |
|---|---|---|---|
| 8,537,750 B2 | 9/2013 | Jin et al. | |
| 8,615,200 B2 | 12/2013 | Malladi et al. | |
| 8,693,971 B1 | 4/2014 | Balraj et al. | |
| 8,761,784 B2* | 6/2014 | Malladi | H04B 1/713 370/203 |
| 8,902,842 B1* | 12/2014 | Gomadam | H04L 5/0094 370/254 |
| 9,031,123 B2 | 5/2015 | de Victoria | |
| 9,107,223 B2 | 8/2015 | Sorrentino | |
| 9,237,520 B2 | 1/2016 | Lee et al. | |
| 9,374,719 B2 | 6/2016 | Xu et al. | |
| 9,413,562 B2 | 8/2016 | Sahlin et al. | |
| 9,553,660 B2 | 1/2017 | Kishiyama | |
| RE46,406 E | 5/2017 | Hooli et al. | |
| 9,667,355 B2 | 5/2017 | Kwon | |
| 9,814,054 B2 | 11/2017 | Ohwatari et al. | |
| 2007/0030914 A1 | 2/2007 | Ding et al. | |
| 2009/0011767 A1* | 1/2009 | Malladi | H04B 1/713 455/450 |
| 2011/0261770 A1 | 10/2011 | Yu et al. | |
| 2012/0263138 A1* | 10/2012 | Malladi | H04B 1/713 370/329 |
| 2014/0269492 A1 | 9/2014 | Forenza et al. | |
| 2014/0321369 A1 | 10/2014 | Davydov et al. | |
| 2015/0181589 A1 | 6/2015 | Luo et al. | |
| 2017/0111894 A1* | 4/2017 | Chen | H04L 5/0048 |
| 2017/0264408 A1 | 9/2017 | Patel et al. | |
| 2017/0332364 A1 | 11/2017 | Sano et al. | |
| 2018/0097534 A1 | 4/2018 | Manolakos et al. | |
| 2018/0367271 A1* | 12/2018 | Park | H04L 5/0048 |
| 2019/0098615 A1* | 3/2019 | Wang | H04L 5/0051 |
| 2019/0173639 A1* | 6/2019 | Tang | H04W 72/04 |
| 2019/0319760 A1* | 10/2019 | Tang | H04L 5/00 |

FOREIGN PATENT DOCUMENTS

| | | |
|---|---|---|
| WO | 2017049599 A1 | 3/2017 |
| WO | 2017052448 A1 | 3/2017 |
| WO | 2017111649 A1 | 6/2017 |
| WO | 2018031013 A1 | 2/2018 |

OTHER PUBLICATIONS

Kang, et al. "A Novel Channel Estimation Scheme for OFDM/OQAM-IOTA System" ETRI journal 29.4 (2007): 430-436.
Ku, et al. "A refined channel estimation method for STBC/OFDM systems in high-mobility wireless channels" IEEE Transactions on Wireless Communications 7.11 (2008). 9 pages.
Kang, et al. "A comparative investigation on channel estimation algorithms for OFDM in mobile communications" IEEE Transactions on Broadcasting 49.2 (2003): 142-149.
Shen, et al. "Channel estimation in OFDM systems" Freescale semiconductor application note (2006): 16 pages.

* cited by examiner

TRANSMITTING REFERENCE SIGNALS IN 5G OR OTHER NEXT GENERATION COMMUNICATION SYSTEMS

CROSS-REFERENCE TO RELATED APPLICATION

This application claims priority to U.S. Provisional Patent Application No. 62/670,510, filed May 11, 2018, and entitled "TRANSMITTING REFERENCE SIGNALS IN 5G OR OTHER NEXT GENERATION COMMUNICATION SYSTEMS," the entirety of which is hereby incorporated herein by reference.

TECHNICAL FIELD

The subject disclosure relates generally to communications networks, and, for example, to transmitting reference signals in 5G or other next generation communication systems.

BACKGROUND

To meet the significant demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

The above-described description is merely intended to provide a contextual overview relating to communication networks, and is not intended to be exhaustive.

BRIEF DESCRIPTION OF THE DRAWINGS

Various non-limiting embodiments are further described with reference to the accompanying drawings in which.

DETAILED DESCRIPTION

Figure 1:
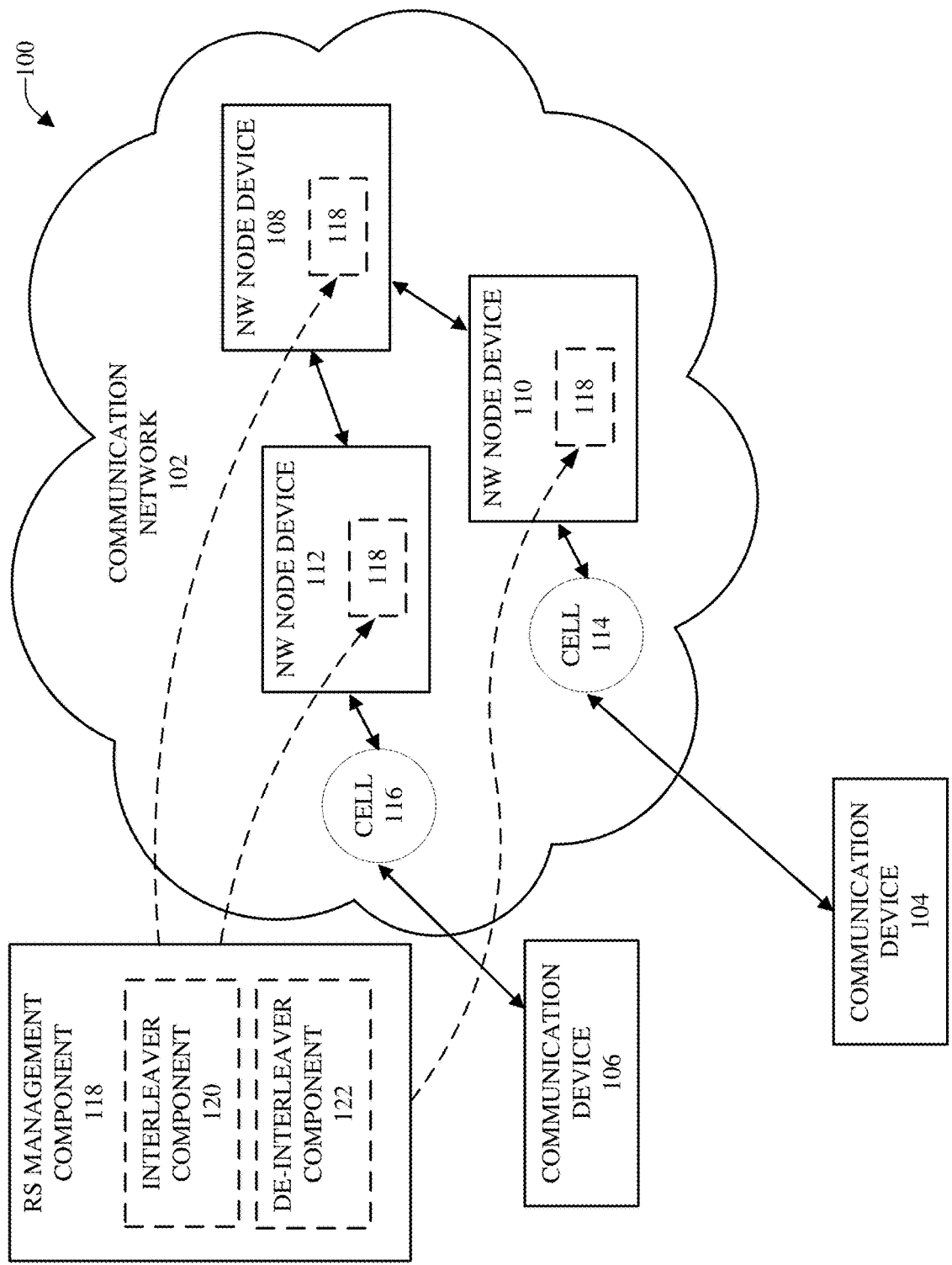
FIG. 1 depicts a block diagram of an example, non-limiting system that can manage reference signals to facilitate reducing interference on reference signals from other co-channel reference signals, in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to reducing the interference on reference signals from other co-channel reference signals, and improving the channel estimation performance for channel state information (CSI) estimation and data detection, in 5G or other next generation networks. With reduction in the interference on reference signals from other co-channel reference signals, and improvement in the channel estimation performance for CSI estimation and data detection, the disclosed subject matter can significantly improve the link and system throughput.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiple with a factor of $N_t$ over single antenna systems in a rich scattering environment.

To meet the significant demand for data centric applications, 3GPP systems and systems that employ one or more aspects of the specifications of the 4G standard for wireless communications can be extended to a 5G standard for wireless communications. Some unique challenges can exist to provide levels of service associated with forthcoming 5G, or other next generation, standards for wireless communication.

When reference signals are transmitted within a resource block, data traffic channel mapping to the time-frequency grid of the resource block can be modified to avoid the resource elements in which the reference signals are transmitted. However, one of the significant bottlenecks for high performance in 5G wireless communication system can be the interference from other cells, also called co-channel interference for both data and reference signals. The impact due to interference in data channels can be minimized by interpreting the channel quality indicator (CQI) and scheduling the user equipment (UE) accordingly with the proper modulation and coding scheme (MCS). However, the reference signals can be impacted by interference from the other cell signals. This in turn can impact the channel estimation on these resource elements. This can imply or indicate that the UE can be estimating a corrupted CSI, and further, at the time of data detection, can be estimating corrupted channel for data detection (e.g., there can be inaccurate CSI and inaccurate data detection). Hence, there can be a relatively high probability that the packets might fail. This in turn can reduce the throughput and capacity of the 5G systems. Hence, an efficient solution can be desirable to improve the channel estimation performance, which can thereby improve the capacity for 5G systems.

To that end, the disclosed subject matter presents techniques, methods, and systems that can transmit reference signals (e.g., channel state information (CSI)-reference signals (RS) (CSI-RS), demodulation reference signals (DM-RS)) having respective signal patterns in the coding chain to improve performance of MIMO communication systems are presented. For downlink transmissions, for example, where two cells can be proximately located to each other (e.g., where co-channel interference of reference signals potentially can occur), a network node (e.g., a base station or other network node device of a communication network) can comprise an RS management component that can determine a first resource element pattern to use for first reference signals of a first cell and a second resource element pattern to use for second reference signals of a second cell in the time domain, frequency domain, or code domain.

In some embodiments, the RS management component can utilize an adaptive interleaver (e.g., in the frequency domain) in the coding chain to improve performance of MIMO communication systems. In accordance with various embodiments, the RS management component can facilitate configuring user equipment (UE) about the adaptive interleaver at the resource element domain, or the RS management component can facilitate configuring the UE about the adaptive interleaver as part of virtual resource block (VRB)-to-physical resource block (PRB) domain. The techniques employed by the RS management component can reduce interference on reference signals from other co-channel reference signals, which can thereby improve channel estimation performance for channel-state-information estimation and data detection by the UE. As a result, significant gains in link and system throughputs can be achieved.

These and other aspects and embodiments of the disclosed subject matter will now be described with respect to the drawings.

FIG. 1 depicts a block diagram of an example, non-limiting system 100 that can manage reference signals to facilitate reducing interference on reference signals from other co-channel reference signals, in accordance with one or more embodiments described herein. The system 100 can comprise a communication network 102 that can facilitate (e.g., enable) communications between communication devices (e.g., UEs), including, for example, communication device 104 and communication device 106, associated with (e.g., communicatively connected to) the communication network 102. The communication network 102 can comprise various components, such as network (NW) node devices (e.g., radio network node devices), including, for example, network node device 108, network node device 110, and network node device 112, that can be part of the communication network 102 to facilitate communication of information between devices (e.g., communication devices 104, 106, . . . ) that can be associated with (e.g., communicatively connected to) the communication network 102. The communication network 102, including the network node devices (e.g., 108, 110, 112, . . . ), can employ MIMO technology to facilitate data communications between devices (e.g., network node devices, communication devices, . . . ) in the communication network 102.

As used herein, the terms "network node device," "network node," and "network device" can be interchangeable with (or include) a network, a network controller or any number of other network components. Further, as utilized herein, the non-limiting term radio network node, or network node (e.g., network device, network node device) can be used herein to refer to any type of network node serving communications devices (e.g., 104, 106, . . . ) and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices also can comprise multiple antennas for performing various transmission operations (e.g., MIMO operations). A network node can comprise a cabinet and other protected enclosures, an antenna mast, and actual antennas. Network devices can serve several cells, also called sectors, depending on the configuration and type of antenna. Network node devices (e.g., 108, 110, 112, . . . ) can be, for example, Node B devices, base station (BS) devices, access point (AP) devices, TRPs, and radio access network (RAN) devices. Other examples of network node devices can include multi-standard radio (MSR) node devices, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like.

A communication device (e.g., 104, 106, . . . ) also can be referred to as, for example, a device, a mobile device, or a mobile communication device. The term "mobile device" can be interchangeable with (or include) a UE or other terminology. Mobile device (or UE) can refer to any type of wireless device that can communicate with a radio network node (e.g., network node device 108, 110, or 112, . . . ) in a cellular or mobile communication system. Examples of mobile devices can include, but are not limited to, a target device, a device to device (D2D) UE, a machine type UE or a UE capable of machine to machine (M2M) communication, a Personal Digital Assistant (PDA), a tablet or pad (e.g., an electronic tablet or pad), a mobile terminal, a cellular and/or smart phone, a computer (e.g., a laptop embedded equipment (LEE), a laptop mounted equipment (LME), or other type of computer), a dongle (e.g., a Universal Serial Bus (USB) dongle), an electronic gaming device, electronic eyeglasses, headwear, or bodywear (e.g., electronic eyeglasses, headwear, or bodywear having wireless communication functionality), a device associated or integrated with a vehicle, and so on.

It is noted that the various aspects of the disclosed subject matter described herein can be applicable to single carrier as well as to multicarrier (MC) or carrier aggregation (CA) operation of the mobile device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech is simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

The communication network 102 can comprise a set of cells, including, for example, cell 114 and cell 116, wherein respective cells can be associated with respective base stations (e.g., network node device 110, network node device 112, when such devices are configured as base stations). For example, a radio access network (RAN) (not shown in FIG. 1) can comprise or be associated with a set of base stations that can serve communication devices (e.g., 104, 106, . . . ) located in respective coverage areas (e.g., respective cell coverage areas) served by respective base stations in the communication network 102. In some embodiments, the RAN can be a cloud-RAN (C-RAN) that can be located in or associated with a cloud computing environment, comprising various cloud network components of the communication network 102. The respective cells (e.g., 114, 116, . . . ) of the set of cells can have respective coverage areas that can form the coverage area covered by one or more sectors of the communication network 102. The respective communication devices (e.g., 104, 106, . . . ) can be communicatively connected to the communication network 102 via respective wireless communication connections with one or more of the respective cells (e.g., 114, 116, . . . ). For example, as depicted, communication device 104 can be connected to the communication network 102 via cell 114, and communication device 106 can be connected to the communication network 102 via cell 116.

The respective cells (e.g., 114, 116, . . . ) can have respective characteristics, features, and/or performance indicators (e.g., bandwidths, subcarrier activity factors, and/or other performance indicators (e.g., key performance indicators (KPIs)). For example, a first cell (e.g., 114) can have a first set of performance indicators (e.g., a first bandwidth associated with a first frequency band (e.g., 700 megahertz (MHz)), a first subcarrier activity factor (Q), . . . ), and a second cell (e.g., 116) can have a second set of performance indicators (e.g., a second bandwidth associated with a second frequency band (e.g., 1700 MHz, 1900 MHz, 2500 MHz, or other higher frequency, a second subcarrier activity factor, . . . ). The respective cells (e.g., 114, 116, . . . ) can have respective capacities that can depend on a variety of factors, including, for example, the bandwidth of a cell, radio frequency (RF) conditions of communication devices (e.g., 104, 106, . . . ) in the communication network 102, proximity to a tower, the number of neighbor towers in the area, and/or another factor(s) that can cause interference in communications in the communication network 102. Typically, the higher the capacity of a cell, the better performance that communication devices can experience (e.g., faster communication rates or data downloads). All other factors being equal, a cell having a higher frequency band (e.g., 1900 MHz) than another cell having a relatively lower frequency band (e.g., 700 MHz) can typically have a higher capacity than the other cell.

The coverage area of a cell (e.g., 114) can overlap one or more other coverage areas of one or more other cells (e.g., 116) that are, for example, neighboring, adjacent to, or in proximity to the cell (e.g., 114), or the cells (e.g., 114, 116, . . . ) can otherwise be located in relation to each other such that there can be a potential for interference in communications in the communication network 102 (e.g., interference on reference signals from other co-channel reference signals). In some embodiments, two cells can be associated with a same site, such as a site associated with a base station. For example, a cell having a first set of characteristics, features, and/or performance indicators (e.g., bandwidths, subcarrier activity factors, and/or other performance indicators) and another cell having a second set of characteristics, features, and/or performance indicators can be associated with the same site, such as a site associated with a base station. In other embodiments, two cells can be associated with different sites associated with different base stations (e.g., as depicted in FIG. 1), wherein a first cell (e.g., cell 114) can be associated with a first base station (e.g., network node device 110) and a second cell (e.g., cell 116) can be associated with a second base station (e.g., network node device 112).

To facilitate communication between network node devices (e.g., base stations) and communication devices (e.g., during downlink transmission), respective network node devices can communicate respective reference signals to respective communication devices. Reference signals can be utilized by a communication device (e.g., 104 or 106) to estimate a channel, wherein the communication device can utilize the channel estimation to facilitate decoding data being communicated to the communication device (e.g., 104 or 106) from the base station (e.g., network node device 110 or 112). If the same type of reference signals is used by cells (e.g., 114, 116, . . . ) that are neighboring or otherwise proximately located to each other, there can be interference between the respective reference signals associated with the respective cells (e.g., 114, 116, . . . ). This can negatively impact the accuracy of channel estimation by a communication device (e.g., 104) receiving reference signals (e.g., some of those reference signals) from a network node device (e.g., network node device 110) associated with the communication device. The negative impact (e.g., reduction) in accuracy of channel estimation can reduce link and system throughput.

In accordance with various embodiments, one or more of the network node devices (e.g., 108, 110, and/or 112, . . . ) can comprise an RS management component 118 that can manage reference signals (e.g., CSI-RS or DM-RS) to facilitate reducing interference on reference signals from other co-channel reference signals, enhancing (e.g., improving) channel estimation (e.g., improving channel estimation accuracy by a communication device), and enhancing link and system throughputs, in accordance with various aspects and embodiments, as more fully described herein. In some embodiments, a network node device 108 can be associated with (e.g., communicatively connected to) network node devices 110 and 112, wherein the network node device 108 can comprise an RS management component 118 to facilitate managing reference signals employed by the network node devices 110 and 112. In other embodiments, the network node device 110 and network node device 112 can comprise respective RS management components 118 to facilitate managing respective reference signals. For example, the RS management component 118 of network node device 110 can coordinate and communicate with the RS management component 118 of network node device 112 with regard to the respective reference signals to employ to facilitate desirably managing the respective reference signals, reducing interference on their respective reference signals from other co-channel reference signals (e.g., reducing interference between their respective reference signals), enhancing respective channel estimation of the respective communication devices (e.g., 104, 106), and enhancing link and system throughputs.

In some embodiments, to facilitate managing reference signals, the RS management component 118 can determine a first resource element pattern (e.g., arrangement, formation, configuration) to use for first reference signals of a first cell (e.g., 114) with respect to a first communication device (e.g., 104) and a second resource element pattern to use for second reference signals of a second cell (e.g., 116) with respect to a second communication device (e.g., 106) in the time domain, frequency domain, or code domain.

In some embodiments, with regard to downlink transmissions, the RS management component 118 can utilize (e.g., optionally can comprise and utilize) an interleaver component 120 (e.g., an adaptive interleaver), for example, in the frequency domain, in the coding chain to facilitate reducing interference on reference signals from other co-channel reference signals and improving performance of MIMO communication systems. In accordance with certain embodiments, the RS management component 118 can facilitate configuring the communication device (e.g., 104) about the interleaver component 120 at the resource element domain. In some embodiments, the RS management component 118 can facilitate configuring the communication device (e.g., 104) about the interleaver component 120 as part of the VRB-to-PRB domain.

Correspondingly, in other embodiments, with regard to uplink transmissions, if an interleaver component is used with regard to reference signals at the transmission end (e.g., by an RS management component of the communication device), the RS management component 118 can utilize (e.g., optionally can comprise and utilize) a de-interleaver component 122 (e.g., an adaptive de-interleaver), for example, in the frequency domain, in the coding (e.g., decoding) chain to facilitate processing reference signals (e.g., from the communication device), demodulating signals (e.g., coherently demodulating signals), and/or estimating the channel for uplink data transmission.

The RS management component 118 can communicate information regarding the reference signals, including, for example, the resource element pattern or interleaved resource element pattern employed for communicating the reference signals, and/or domain information (e.g., time, frequency, or code domain), to the communication device (e.g., 104) to facilitate informing the communication device about the configuration (e.g., resource element pattern, domain, . . . ) of the reference signals being used (e.g., for downlink transmission). In this way, the communication device (e.g., 104) can know where to locate the resource elements in the reference signal transmission. The RS management component 118 can communicate such information regarding the reference signals to the communication device (e.g., 104) using RRC signaling, downlink control information (DCI) (e.g., through dynamic signaling using DCI), or other type of signaling.

Figure 2:
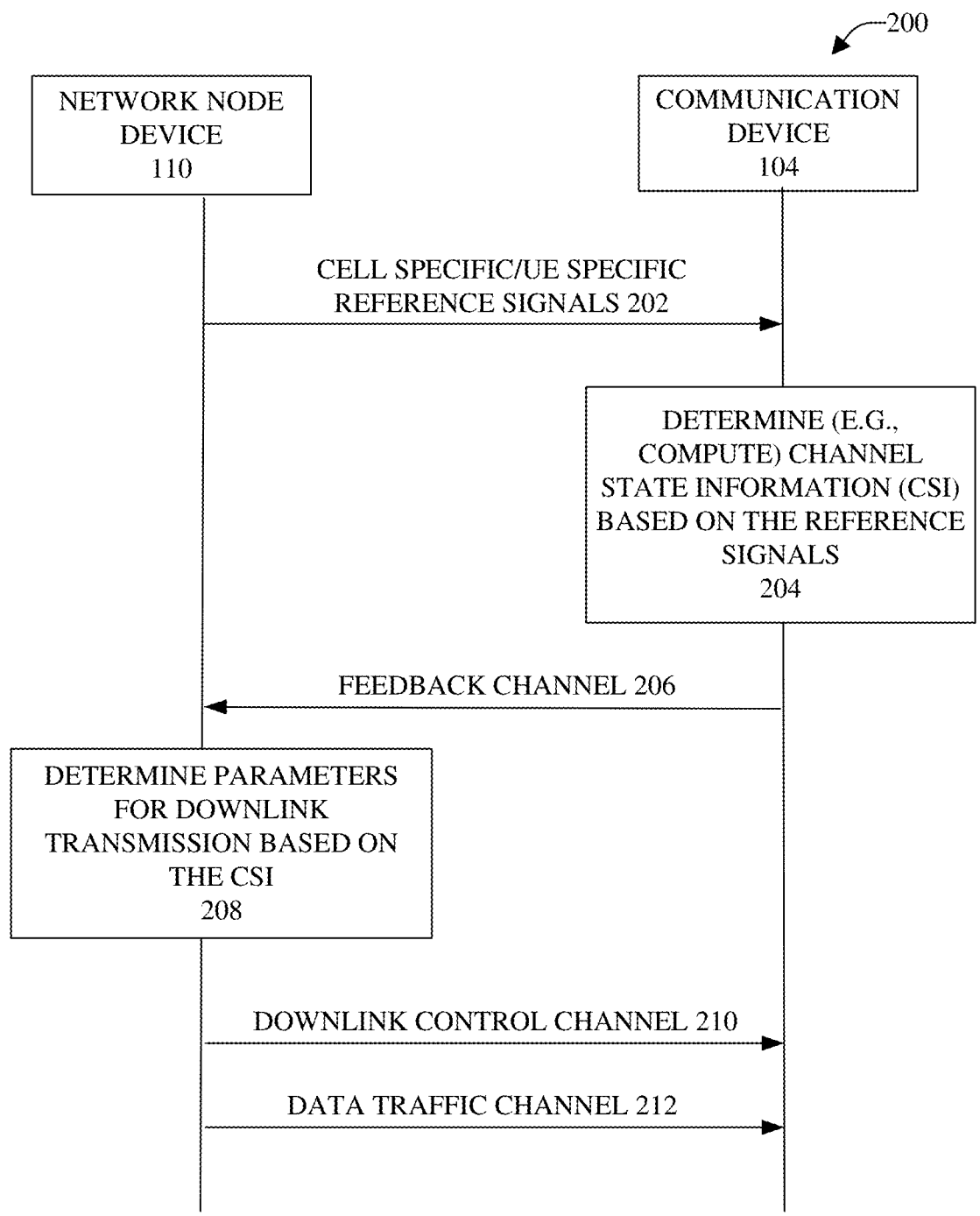
FIG. 2 illustrates a block diagram of an example, non-limiting message sequence flow chart for a downlink data transmission in 5G systems, in accordance with one or more embodiments described herein.

Referring to FIG. 2 (along with FIG. 1), FIG. 2 illustrates a block diagram of an example, non-limiting message sequence flow chart 200 for a downlink data transmission in 5G systems, in accordance with one or more embodiments described herein. The non-limiting message sequence flow chart 200 can be utilized for new radio, as disclosed herein. As illustrated, the non-limiting message sequence flow chart 200 can represent the message sequence between a network node device 110 and the communication device 104.

In connection with, for example, a downlink data transmission, as indicated at reference numeral 202 of the message sequence flow chart 200, the network node device 110 can communicate cell specific or UE specific reference signals to the communication device 104. As indicated at reference numeral 204 of the message sequence flow chart 200, the communication device 104 can analyze the cell specific or UE specific reference signals, and can determine (e.g., compute) channel estimates and parameters for use in channel state information (CSI) reporting in connection with the downlink data transmission based at least in part on the results of analyzing the cell specific or UE specific reference signals and/or other information. The communication device 104 can generate the CSI report, which can comprise, for example, a channel quality indicator (CQI), a precoding matrix index (PMI), rank information (RI), CSI-RS resource indicator (CRI), and/or beam specific information (e.g., beam indicator). Upon request from the network (e.g., the network node device 110 or other network node) aperiodically or per periodic reporting, the communication device 104 can communicate the CSI report to the network node device 110 via a feedback channel, as indicated at reference numeral 206 of the message sequence flow chart 200.

As indicated at reference numeral 208 of the message sequence flow chart 200, a network scheduler of or associated with the network node device 110 can analyze and use the information in the CSI report and/or other information to determine and select parameters for scheduling (e.g., scheduling of transmission of data) for the communication device 104, based at least in part on the results of analyzing the CSI report and/or the other information. The parameters determined for downlink transmission can comprise, for example, modulation and coding scheme (MCS), power, PRBs, and/or other desired parameters, as more fully described herein. These parameters (e.g., scheduling parameters) can be part of the control information (e.g., DCI) that can be provided (e.g., communicated) to the communication device 104 to facilitate scheduling and execution of the data transmission for the communication device 104.

As indicated at reference numeral 210 of the message sequence flow chart 200, the control information (e.g., DCI) can be communicated via the control channel (e.g., downlink control channel). As indicated at reference numeral 212 of the message sequence flow chart 200, the data of the data transmission can be communicated between the network node device 110 and the communication device 104 via a data traffic channel, in accordance with the control information.

With further regard to downlink reference signals, downlink reference signals can be predefined signals that can occupy specific resource elements within the downlink time-frequency grid. There are several types of downlink reference signals that can be transmitted in different ways and used for different purposes by the receiving terminal (e.g., receiving communication device 104). For example, there can be CSI reference signals (CSI-RS). CSI-RS can be specifically intended to be used by terminals (e.g., mobile devices) to acquire CSI and beam specific information (e.g., beam reference signal received power (beam RSRP)). In 5G, CSI-RS can be UE specific, so it can have a significantly lower time and/or frequency density.

As another example, there also can be DM-RS. DM-RS also sometimes can be referred to as UE-specific reference signals, and such signals can be specifically intended to be used by terminals (e.g., mobile devices) for channel estimation for the data channel. The label "UE-specific" can relate to the fact that each demodulation reference signal can be intended for channel estimation by a single terminal (e.g., communication device 104). That specific reference signal is only transmitted within the resource blocks assigned for data traffic channel transmission to that particular terminal (e.g., particular communication device 104). Other than these reference signals, there also can be other reference signals, such as, for example, multicast broadcast single frequency network (MBSFN) signals, positioning reference signals, phase tracking and tracking, and sounding reference signals (SRS) that can be used for various purposes.

With further regard to MIMO, MIMO systems can significantly increase the data carrying capacity of wireless systems. MIMO can be used for achieving diversity gain, spatial multiplexing gain and beamforming gain. For these reasons, MIMO can be an integral part of the 3G and 4G wireless communication systems. In addition, massive MIMO systems are being considered for use in 5G systems.

Figure 3:
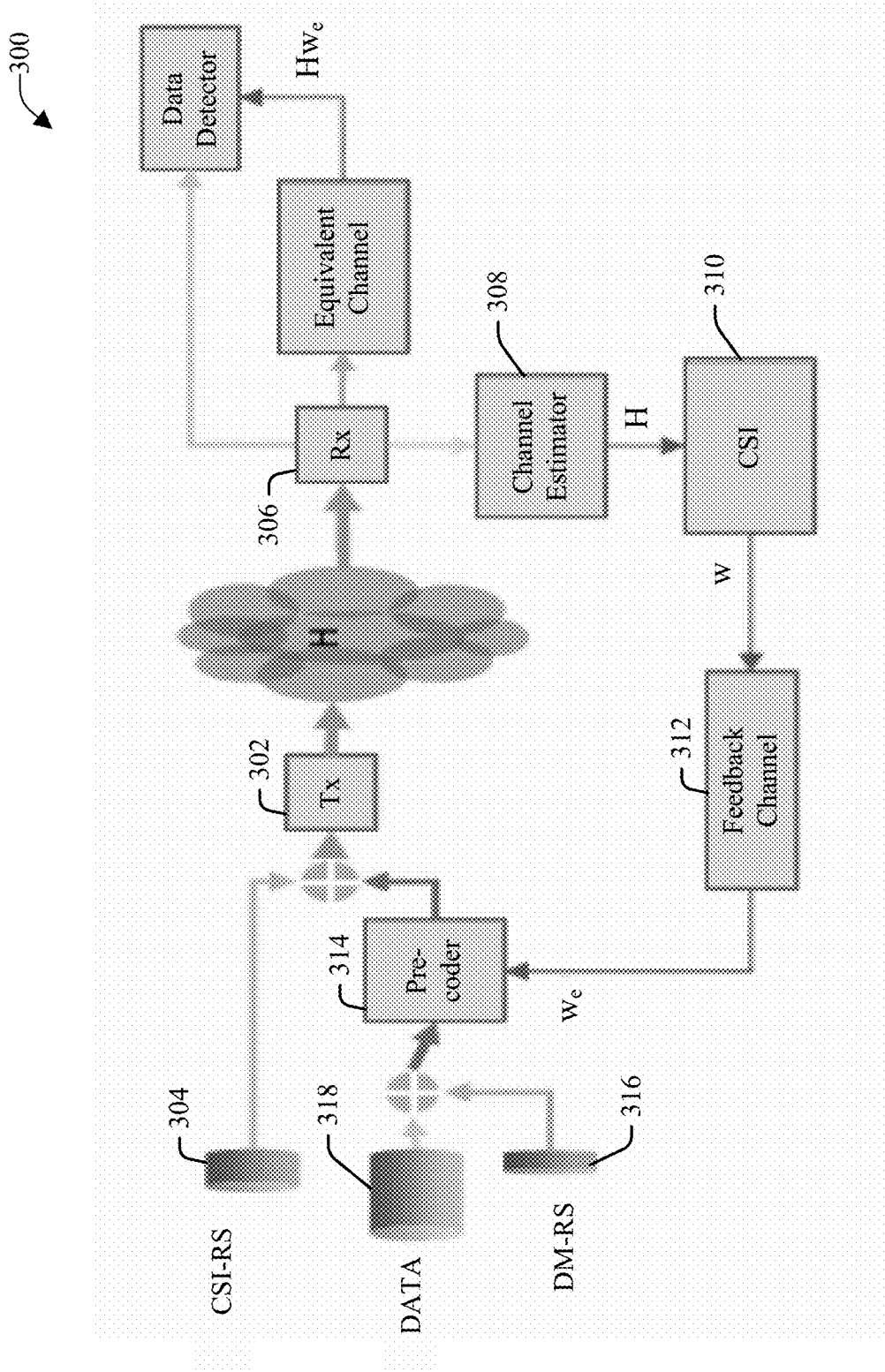
FIG. 3 depicts a block diagram of an example, non-limiting Multiple Input, Multiple Output (MIMO) system with a demodulation reference signal, in accordance with one or more embodiments described herein.

Turning briefly to FIG. 3 (along with FIG. 1), FIG. 3 depicts a block diagram (e.g., a conceptual diagram) of an example, non-limiting MIMO system 300 with a demodulation reference signal, in accordance with one or more embodiments described herein. The non-limiting MIMO system 300 can be utilized for 5G or new radio, as disclosed herein.

At the transmitter (Tx) 302 (e.g., transmitter of a network node (e.g., network node device 110), such as a gNodeB transmitter or other type of network node), the transmitter 302 can transmit common reference signals, such as, for example, CSI-RS 304, for channel sounding. The UE receiver (Rx) 306 (e.g., receiver of the UE (e.g., communication device 104)), employing a channel estimator 308, can estimate channel quality (e.g., SINR) from (e.g., based at least in part on) the channel sounding, and the UE (e.g., communication device 104) can determine (e.g., compute) the preferred PMI, RI, and CQI for the next downlink transmission. This information can be referred to as CSI 310. The UE can convey (e.g., communicate) this information (e.g., CSI) 310 through the feedback channel 312, for example, as described herein.

For downlink data transmission, the network node (e.g., network node device 110) can analyze and use this information (e.g., feedback information or CSI 310), and can choose the precoding matrix as suggested (e.g., recommended) by the UE in the feedback information (e.g., CSI 310), or the network node can determine and select the precoding matrix on its own (other than or instead of selecting the UE-recommended PMI), as indicated in the CSI 310, CQI, and/or the transport block size, etc. (e.g., based at least in part on the results of analyzing the CSI 310, CQI, and/or transport block size, etc.). The network node (e.g., network node device 110), employing a precoder 314, can multiply both the reference signal (DM-RS) 316 and the data 318 by the precoding matrix 316 selected by the network node and, employing the transmitter 302, can transmit the processed (e.g., precoded) DM-RS and data to the UE receiver 306. The UE receiver 306 can estimate or determine the effective channel (e.g., the channel multiplied by the precoding matrix) and can demodulate the data in the data transmission.

Figure 4:
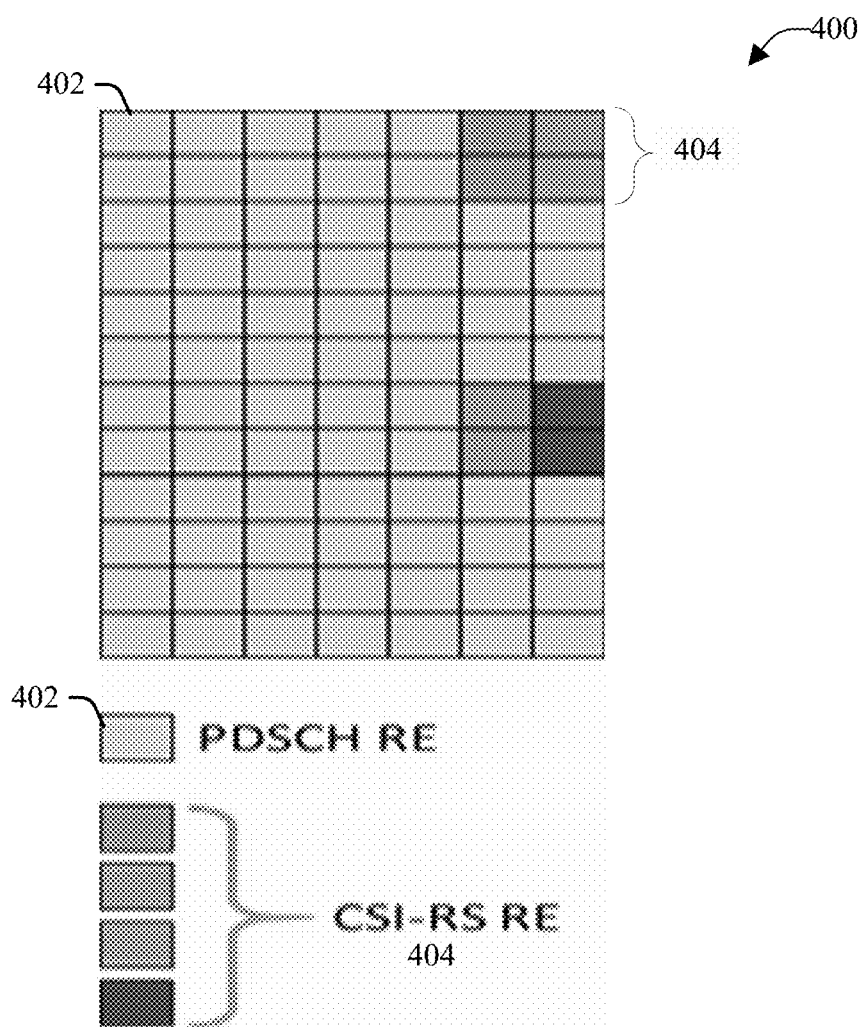
FIG. 4 presents a block diagram of an example, non-limiting channel state information (CSI)-reference signal (RS) (CSI-RS) sequence that can be mapped to the resource elements in the time-frequency grid of a new radio (NR) carrier, in accordance with one or more embodiments described herein.

Referring briefly to FIG. 4 (along with FIG. 1), FIG. 4 presents a block diagram of an example, non-limiting CSI-RS sequence 400 that can be mapped to the resource elements in the time-frequency grid of the NR carrier, in accordance with one or more embodiments described herein. The non-limiting CSI-RS sequence 400 can be utilized for 5G or new radio, as disclosed herein. The CSI-RS sequence 400 can comprise physical downlink resource channel (PDSCH) resource elements (RE) 402 (PDSCH RE). The CSI-RS sequence 400 also can include CSI-RS resource elements 404 (CSI-RS RE) in particular locations of the CSI-RS sequence 400.

Figure 5:
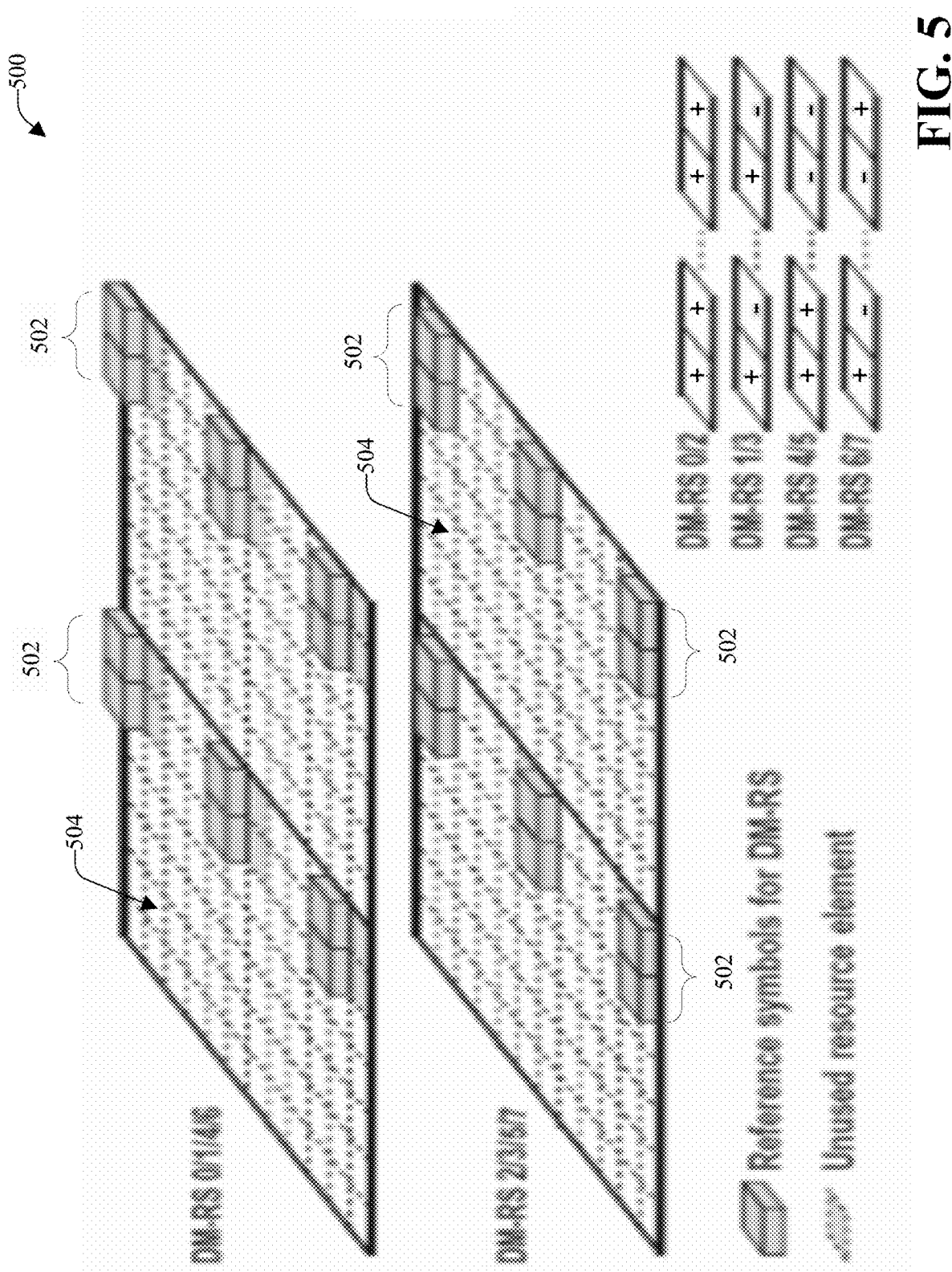
FIG. 5 illustrates a diagram of an example, non-limiting demodulation reference signals (DM-RS) structure for 8 antenna ports in a Long Term Evolution (LTE) system, in accordance with one or more embodiments described herein.

Turning briefly to FIG. 5 (along with FIG. 1), FIG. 5 illustrates a diagram of an example, non-limiting DM-RS structure 500 for 8 antenna ports (hence, a maximum 8 layers and 8 DM-RS) in an LTE system, in accordance with one or more embodiments described herein. The non-limiting DM-RS structure 500 can be utilized for 5G or new radio, as disclosed herein.

As illustrated in the DM-RS structure 500, there can be reference symbols 502 for DM-RS and there can be various unused resource elements 504. It can be observed from the DM-RS structure 500 of FIG. 5 that 24 reference symbols (502) within a resource-block pair can be transmitted. The reference signals can be separated by means of mutually orthogonal signals within each group. When demodulation reference signals are transmitted within a resource block, PDSCH mapping to the time-frequency grid of the resource block can be modified to avoid the resource elements in which the reference signals are transmitted.

As the number of transmitted layers can vary dynamically, the number of transmitted DM-RS also can vary. The terminal (e.g., communication device 104) can be informed about the number of transmitted layers (or the rank) as part of the scheduling information via the downlink control channel, for example, as described herein.

As stated, when reference signals are transmitted within a resource block, data traffic channel mapping to the time-frequency grid of the resource block can be modified to avoid the resource elements in which the reference signals are transmitted. However, one of the significant bottlenecks for high performance in 5G wireless communication system can be the interference from other cells, also called co-channel interference for both data and reference signals. The impact due to interference in data channels can be reduced or minimized by interpreting the CQI and schedule the UE accordingly with the proper MCS. However, the reference signals can be impacted (e.g., negatively impacted) by interference from the other cell signals. This in turn can impact (e.g., negatively impact) the channel estimation on these resource elements. This can imply or indicate that, as a result, the UE can estimate a corrupted CSI, and further, at the time of data detection, can estimate a corrupted channel for data detection (e.g., there can be inaccurate CSI and inaccurate data detection). Hence, there can be an undesirably high probability that the data packets might fail. This in turn can reduce the throughput and capacity of the 5G systems. Hence, an efficient solution can be desirable to improve the channel estimation performance, which can thereby improve the capacity for 5G systems.

To overcome these and other deficiencies, the disclosed subject matter can comprise the RS management component 118 that can employ techniques, methods, and systems that can desirably manage reference signals (e.g., CSI-RS, DM-RS) communicated to communication devices (e.g., communication device 104) to facilitate reducing interference on reference signals from other co-channel reference signals (e.g., of other cells), enhancing (e.g., improving) channel estimation (e.g., improving channel estimation accuracy by a communication device), and enhancing link and system throughputs, in accordance with various aspects and embodiments.

In some embodiments, to facilitate managing reference signals employed with regard to cells that are neighboring or otherwise proximately located to each other (e.g., having cell coverage areas that overlap or are otherwise proximately located to each other), the RS management component 118 can determine a first resource element pattern to use for first reference signals of a first cell (e.g., 114) with respect to a first communication device (e.g., 104) and a second resource element pattern to use for second reference signals of a second cell (e.g., 116) with respect to a second communication device (e.g., 106) in the time domain, frequency domain, or code domain. For example, the RS management component 118 can manage the generation of reference signals in the time domain. The RS management component 118 can determine a first resource element pattern in the time domain to use for first reference signals of the first cell (e.g., 114) with respect to the first communication device (e.g., 104) and a second resource element pattern in the time domain to use for second reference signals of the second cell (e.g., 116) with respect to the second communication device (e.g., 106), wherein resource elements for the first reference signals can be located in a first time location(s) in the first resource element pattern, and resource elements for the second reference signals can be located in a second time location(s) in the second resource element pattern. The first time location(s) can be different from the second time location(s). This can facilitate reducing or eliminating interference on the first reference signals from other co-channel reference signals, such as the second reference signals, and vice versa.

As another example, the RS management component 118 can manage the generation of reference signals in the frequency domain. The RS management component 118 can determine a first resource element pattern in the frequency domain to use for first reference signals of the first cell (e.g., 114) with respect to the first communication device (e.g., 104) and a second resource element pattern in the frequency domain to use for second reference signals of the second cell (e.g., 116) with respect to the second communication device (e.g., 106), wherein resource elements for the first reference signals can have a first frequency shift, and/or can employ a first frequency shift function, in, or for, the first resource element pattern, and resource elements for the second reference signals can have a second frequency shift, and/or can employ a second frequency shift function, in, or for, the second resource element pattern. The first frequency shift and/or first frequency shift function can be different from the second frequency shift and/or second frequency shift function, respectively. This can facilitate reducing or eliminating interference on the first reference signals from other co-channel reference signals, such as the second reference signals, and vice versa.

As still another example, the RS management component 118 can manage the generation of reference signals in the code domain. The RS management component 118 can determine a first resource element pattern in the code domain to use for first reference signals of the first cell (e.g., 114) with respect to the first communication device (e.g., 104) and a second resource element pattern in the code domain to use for second reference signals of the second cell (e.g., 116) with respect to the second communication device (e.g., 106), wherein resource elements for the first reference signals can have a first code, and/or can employ a first code function, in, or for, the first resource element pattern, and resource elements for the second reference signals can have a second code, and/or can employ a second code function, in, or for, the second resource element pattern. The first code and/or first code function can be different from the second code and/or second code function, respectively. For instance, the second code can be orthogonal to the first code. This can facilitate reducing or eliminating interference on the first reference signals from other co-channel reference signals, such as the second reference signals, and vice versa.

In some embodiments, the RS management component 118 can utilize the interleaver component 120 to facilitate configuring the communication device 104 about the interleaver component 120 at the resource element and/or frequency domain In certain embodiments, the interleaver component 120 can be utilized to facilitate configuring the communication device 104 about the interleaver as part of VRB-to-PRB domain. The interleaver component 120 (e.g., adaptive interleaver) can interleave resource elements (e.g., in the frequency domain) to form a desired resource element pattern (e.g., an interleaved resource element pattern) for use in generating and transmitting desired reference signals. For instance, the interleaver component 120 can employ an interleaver function that can facilitate interleaving the resource elements, based at least in part on the interleaver function, to form an interleaved resource element pattern (e.g., an interleaved resource element pattern) for use in generating desired reference signals.

With regard to a neighboring or proximately located cell (e.g., cell 116), the RS management component 118 (or a second RS management component 118 associated with another network node device (e.g., 112)) can employ the interleaver component 120 (or a second interleaver component of the second RS management component) to utilize a second (e.g., different) interleaver function that can facilitate interleaving other resource elements (e.g., in the frequency domain), based at least in part on the second interleaver function, to form a second (e.g., different) interleaved resource element pattern for use in generating and transmitting desired second reference signals (e.g., for use with the communication device 106 associated with cell 116). This can facilitate reducing or eliminating interference on the reference signals associated with the communication device 104 and cell 114 from other co-channel reference signals, such as the second reference signals, associated with, for example, communication device 106 and cell 116, and vice versa.

In accordance with various embodiments, the RS management component 118, with or without using the interleaver component 120, can randomize the placement of resource elements in the resource element pattern for the reference signals to facilitate reducing any potential interference on the reference signals (e.g., for communication device 104) from other co-channel reference signals (e.g., reference signals for communication device 106 associated with cell 116). For instance, the RS management component 118 can employ a randomizing function that can be applied when determining the placement (e.g., locations, positions) of resource elements in the resource element pattern being developed for use in generating and transmitting the reference signals to randomly determine the respective placement of respective resource elements in the resource element pattern. The randomizing function can utilize true random numbers or pseudo-random numbers, and can utilize one or more desired seeds (e.g., seed values) to seed the randomizing function to facilitate generating the random values, based at least in part on the one or more seeds and the randomizing function, wherein the random values can be used to facilitate the random determination of the respective placement of respective resource elements in the resource element pattern.

In certain embodiments, with regard to a neighboring (e.g., adjacent) or proximately located cell (e.g., cell 116), the RS management component 118 (or a second RS management component 118 associated with another network node device (e.g., 112)) can employ a second (e.g., different) randomizing function that can be applied when determining the placement (e.g., locations, positions) of other resource elements in a second (e.g., different) resource element pattern being developed for use in generating and transmitting second reference signals to randomly determine the respective placement of respective other resource elements in the second resource element pattern. This can facilitate reducing or eliminating interference on the reference signals associated with the communication device 104 and cell 114 from other co-channel reference signals, such as the second reference signals, associated with, for example, communication device 106 and cell 116, and vice versa.

Figure 6:
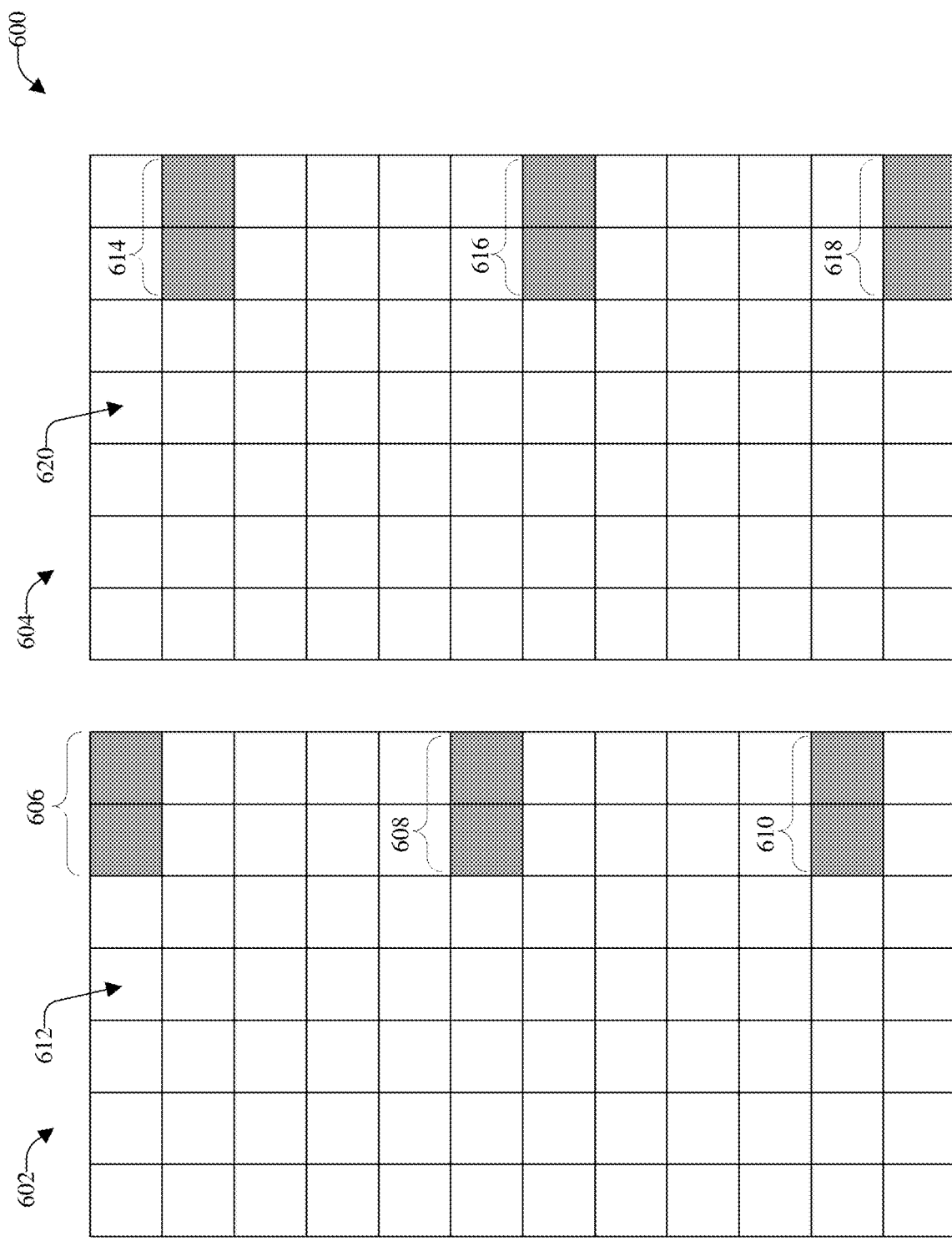
FIG. 6 presents a diagram of example, non-limiting resource element patterns that can illustrate the use of different resource element patterns for use in generating different reference signals for neighboring or proximately located cells, in accordance with one or more embodiments described herein.

Referring briefly to FIG. 6 (along with FIG. 1), FIG. 6 presents a diagram of example, non-limiting resource element patterns 600 that can illustrate the use of different resource element patterns for use in generating different reference signals for neighboring or proximately located cells, in accordance with one or more embodiments described herein. The non-limiting resource element patterns 600 can be utilized for 5G or new radio, as disclosed herein. It is to be appreciated and understood that the non-limiting resource element patterns 600 are for illustration purposes, are not domain specific, and the principles illustrated in the non-limiting resource element patterns 600 can be applied and/or adapted for use with virtually any type of reference signals (e.g., CSI-RS, DM-RS, . . . ) and in virtually any domain, such as, for example, the time domain, frequency domain, code domain, resource element domain, and/or VRB-to-PRB domain.

The resource element patterns 600 can comprise a first resource element pattern 602 that can be associated with (e.g., used for) the communication device 104 associated with cell 114. The resource element patterns 600 also can include a second resource element pattern 604 that can be associated with (e.g., used for) the communication device 106 associated with cell 116. As depicted in FIG. 6, the first resource element pattern 602 can comprise a grid of resource elements. The RS management component 118 can determine and generate the first resource element pattern 602 to have certain resource elements available, reserved, or assigned for use in transmitting first reference signals to the communication device 104. In the example first resource element pattern 602, there can be pairs of resource elements for the first reference signals, although it is to be appreciated and understood that, in other embodiments, the resource elements for the reference signals can be arranged as single resource elements or more than pairs (e.g., three, four, . . . ) of resource elements. The RS management component 118 can structure the example first resource element pattern 602 to have resource elements for the first reference signals, including resource elements 606 in the first row, resource elements 608 in the sixth row, and resource elements 610 in the eleventh row. That is, there can be resource elements for the reference signals every five rows (e.g., every five symbols), starting with the first row (e.g., first symbol). The remaining resource elements (e.g., 612) of the first resource element pattern 602 can be utilized for data or can remain unused.

The RS management component 118 (or another RS management component associated with cell 116) can determine and generate the second resource element pattern 604 to have certain resource elements available, reserved, or assigned for use in transmitting second reference signals to the communication device 106. In the example second resource element pattern 604, there can be pairs of resource elements for the second reference signals, although it is to be appreciated and understood that, in other embodiments, the resource elements for the second reference signals can be arranged as single resource elements or more than pairs of resource elements. The RS management component 118 (or the other RS management component) can structure the example second resource element pattern 604 to have resource elements for the second reference signals, including resource elements 614 in the second row, resource elements 616 in the seventh row, and resource elements 618 in the twelfth row. That is, there can be resource elements for the reference signals every five rows (e.g., every five symbols), starting with the second row (e.g., second symbol). The remaining resource elements (e.g., 620) of the second resource element pattern 604 can be utilized for data or can remain unused.

For instance, the RS management component 118 can identify that, with regard to the communication device 106 associated with cell 116, the resource elements (e.g., 614, 616, 618) for the second reference signals are positioned in the second, seventh, and twelfth rows in the resource element grid, in accordance with the second resource element pattern 604 based at least in part on the knowledge the RS management component 118 has regarding the second resource element pattern 604 due to forming the second resource element pattern 604 itself or from information regarding the second resource element pattern 604 received from another RS management component. The RS management component 118 can determine, select, shift, adjust, or otherwise arrange the resource elements for the first reference signals associated with communication device 104, associated with cell 114, to have the resource elements (e.g., 606, 608, 610) for the first reference signals located in different locations or positions in the resource element grid, as shown in the first resource element pattern 602, wherein the resource elements for the first reference signals can be in the first, sixth, and eleventh rows. Since the first reference signals are in different resource element locations (e.g., positions) in the grid of resource elements than the second reference signals (e.g., the first reference signals are in the first, sixth, and eleventh rows, while the second reference signals are in the second, seventh, and twelfth rows of their respective resource element grids), interference (e.g., co-channel interference) can be avoided, eliminated, or reduced between the first reference signals for the communication device 104 associated with cell 114 and the second reference signals for the communication device 106 associated with cell 116.

Figure 7:
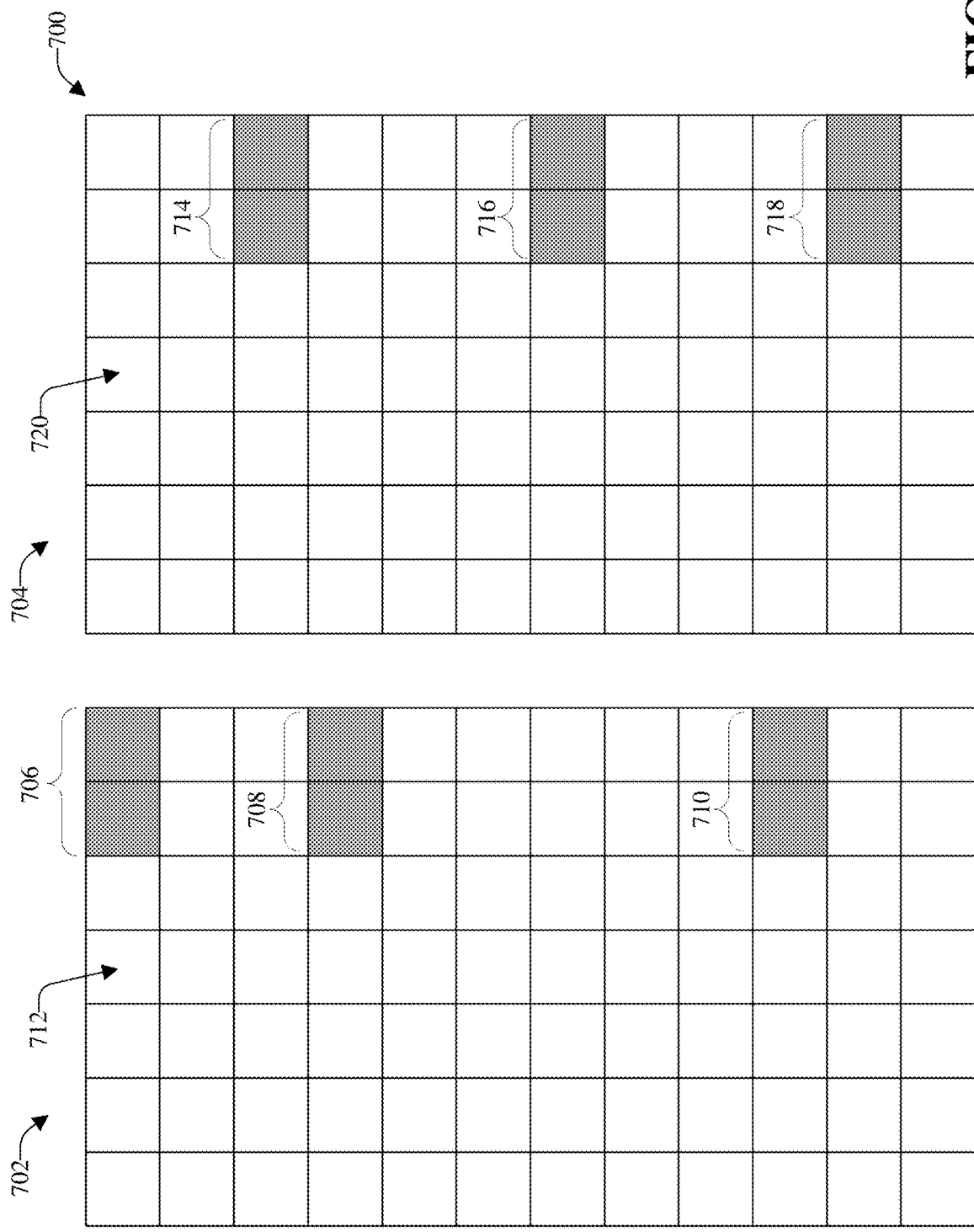
FIG. 7 presents a diagram of example, non-limiting resource element patterns that can illustrate the use of different randomly determined resource element patterns for use in generating respective reference signals for neighboring (e.g., adjacent) or proximately located cells, in accordance with one or more embodiments described herein.

Turning briefly to FIG. 7 (along with FIG. 1), FIG. 7 presents a diagram of example, non-limiting resource element patterns 700 that can illustrate the use of different randomly determined resource element patterns for use in generating respective reference signals for neighboring (e.g., adjacent) or proximately located cells, in accordance with one or more embodiments described herein. The non-limiting resource element patterns 700 can be utilized for 5G or new radio, as disclosed herein. It is to be appreciated and understood that the non-limiting resource element patterns 700 are for illustration purposes, are not domain specific, and the principles illustrated in the non-limiting resource element patterns 700 can be applied and/or adapted for use with virtually any type of reference signals (e.g., CSI-RS, DM-RS, . . . ) and in virtually any domain, such as, for example, the time domain, frequency domain, code domain, resource element domain, and/or VRB-to-PRB domain.

The resource element patterns 700 can comprise a first resource element pattern 702 (e.g., a first randomly determined or generated resource element pattern) that can be associated with the communication device 104 associated with cell 114. The resource element patterns 700 also can include a second resource element pattern 704 (e.g., a second randomly determined or generated resource element pattern) that can be associated with the communication device 106 associated with cell 116. As illustrated in FIG. 7, the first resource element pattern 702 can comprise a grid of resource elements. The RS management component 118 can determine (e.g., randomly determine) and generate the first resource element pattern 702 (e.g., generate a resource element grid arranged in the form of the first resource element pattern 702) to have certain resource elements available, reserved, or assigned for use in transmitting first reference signals to the communication device 104, based at least in part on a first randomizing function and one or more seeds for use to seed the first randomizing function. In the example first resource element pattern 702, there can be pairs of resource elements for the first reference signals, although it is to be appreciated and understood that, in other embodiments, the resource elements for the reference signals can be arranged as single resource elements or more than pairs of resource elements. For example, based at least in part on the first randomizing function and the one or more seeds, the RS management component 118 can randomly determine and structure the example first resource element pattern 702 to have resource elements for the first reference signals, including resource elements 706 in the first row (e.g., first symbol), resource elements 708 in the fourth row, and resource elements 710 in the tenth row. The remaining resource elements (e.g., 712) of the first resource element pattern 702 can be utilized for data or can remain unused.

The RS management component 118 (or another RS management component associated with cell 116) can determine (e.g., randomly determine) and generate the second resource element pattern 704 (e.g., generate a resource element grid arranged in the form of the second resource element pattern 704) to have certain resource elements available, reserved, or assigned for use in transmitting second reference signals to the communication device 106, based at least in part on a second randomizing function and one or more seeds for use to seed the second randomizing function. For instance, based at least in part on the second randomizing function and the one or more seeds, the RS management component 118 (or the other RS management component) can randomly determine or structure the example second resource element pattern 704 to have resource elements for the second reference signals, including resource elements 714 in the third row (e.g., third symbol), resource elements 716 in the seventh row, and resource elements 718 in the eleventh row. The remaining resource elements (e.g., 720) of the second resource element pattern 704 can be utilized for data or can remain unused.

For example, the RS management component 118 can identify that, with regard to the communication device 106 associated with cell 116, the respective locations of the resource elements (e.g., 714, 716, 718) for the second reference signals are being randomly determined in the resource element grid, in accordance with the second resource element pattern 704, using the second randomizing function, based at least in part on the knowledge the RS management component 118 has regarding the second resource element pattern 704 and/or the second randomizing function due to forming the second resource element pattern 704 itself or from information regarding the second resource element pattern 704 and/or the second randomizing function received from another RS management component. With such knowledge, the RS management component 118 can utilize the first (e.g., different) randomizing function to randomly determine, select, or otherwise arrange the resource elements for the first reference signals associated with communication device 104, associated with cell 114, to have the resource elements (e.g., 706, 708, 710) for the first reference signals located (e.g., randomly located) in different locations or positions in the resource element grid (e.g., than the second resource element pattern 704), as shown in the first resource element pattern 702, wherein the resource elements for the first reference signals can be in the first, fourth, and tenth rows. Since the first reference signals are in different resource element locations (e.g., positions) in the resource element grid than the second reference signals (e.g., the first reference signals are in the first, fourth, and tenth rows, while the second reference signals are in the third, seventh, and eleventh rows, of their respective resource element grids), interference (e.g., co-channel interference) can be avoided, eliminated, or reduced between the first reference signals for the communication device 104 associated with cell 114 and the second reference signals for the communication device 106 associated with cell 116.

With further regard to FIG. 1, to facilitate using respective resource element patterns for respective communication devices associated with respective cells (e.g., respective neighboring or proximately located cells), the RS management component 118 can inform or notify communication devices (e.g., 104 and/or 106) of the resource element patterns that are being used to communicate the reference signals and data to the communication devices (e.g., during downlink transmission). For example, the RS management component 118 can communicate information regarding a resource element pattern being used to communicate reference signals and data to the communication device 104 using a desired signal or message, wherein the information regarding the resource element pattern can indicate which resource elements in the resource element grid are being used for reference signals and which resource elements in the resource element grid are being used for data. The desired signal or message can be, for example, a radio resource control (RRC) signal, a signal (e.g., downlink control signal) communicated as part of downlink control information (DCI), a media access control (MAC) signal associated with a MAC layer, another signal (e.g., another control signal) associated with a physical layer, and/or another higher layer signal. The signal communicated as part of DCI can be a signal that can be dynamically communicated by the RS management component 118 to the communication device 104, for example.

There can be instances where utilizing respective resource patterns for respective communication devices associated with respective cells (e.g., adjacent cells) may not be beneficial, or at least can be determined (e.g., by the RS management component 118) to not be sufficiently beneficial or useful. For example, when the communication system load associated with the cells (e.g., adjacent, neighboring, or otherwise proximately located cells) is relatively high (e.g., when the communication system load exceeds or satisfies a defined threshold (e.g., high or upper threshold) load level), the use of respective resource patterns for respective communication devices associated with respective cells (e.g., adjacent cells) may not be beneficial, or at least can be determined (e.g., by the RS management component 118) to not be sufficiently beneficial or useful.

The RS management component 118 can monitor and determine the communication system load associated with such cells (e.g., cells 114, 116, . . . ), and can determine whether the communication system load exceeds or satisfies the defined threshold load level (e.g., with regard to network congestion, network resource use, . . . ). In response to determining that the communication system load exceeds or otherwise satisfies the defined threshold load level, the RS management component 118 can determine that the use of a particular (e.g., different) resource element pattern for the communication device 104 and/or the use of the interleaver component 120 to determine a particular resource element pattern and generate a corresponding resource element grid is not to be performed (e.g., because it is not sufficiently beneficial or useful). In such instances, the RS management component 118 can determine, for example, that a default resource element pattern can be used to generate a resource element grid, comprising respective default locations for resource elements used for reference signals and resource elements used for data, and can utilize such default resource element pattern in a resource element grid to communicate reference signals and data. The RS management component 118 also can switch off the interleaver component 120, if the interleaver component 120 was being used. The RS management component 118 further can communication information regarding the default resource element pattern to the communication device 104, and/or information informing the communication device 104 that the particular resource element pattern (e.g., interleaved, randomly determined, or otherwise custom determined resource element pattern) is not going to be used, to the communication device 104. The RS management component 118 can communicate such information regarding the default resource element pattern, and indicating that the default resource element pattern will be used, and/or information that the particular resource element pattern is not going to be used to the communication device 104 and/or that the interleaver component 120 is being switched off, for example, using an RRC signal, a signal via DCI (e.g., dynamical signaling via DCI), a MAC signal, another signal associated with a physical layer, and/or another higher layer signal.

To further illustrate certain aspects and embodiments of the disclosed subject matter, some of the principles behind the disclosed subject matter are to provide more diversity gain to the reference symbols (e.g., reference symbols of or representing reference signals) by customizing, shifting, interleaving, and/or randomizing the locations of resource elements for reference signals (e.g., reference symbols) in a resource element pattern, which can, in turn, provide frequency diversity. For instance, the RS management component 118 can provide more diversity gain to the reference symbols by inserting the interleaver component 120 in the coding chain, which can, in turn, provide a frequency diversity. For example, once the reference symbols are generated and modulated, the RS management component 118 can introduce the interleaver component 120 either in the resource elements level or at the resource block level (e.g., in bundles or groups of resource elements). Due to the introduction of the interleaver component 120 (e.g., to interleave the resource element locations) (or due to the other customization, shifting, and/or randomizing of locations of resource elements for reference signals in a resource element pattern), the interference from the other co-channel users can be randomized, which can thereby reduce or minimize the interference on the resource elements allocated for reference symbols. This can be particularly useful, for example, when the load of the system of other cells is relatively small (e.g., below a defined threshold load level).

To facilitate illustrating some of the principles and aspects of the disclosed subject matter, with regard to a system (e.g., system 100, comprising communication network 102) with a transmitted symbol x, and the signal tap fading channel with tap weight h, the received signal Y can be given, for example, by the following equation:

$$Y = hx + n + I, \quad \text{(Equation (1))}$$

wherein n can be a term that can account for and/or represent noise (e.g., thermal noise) and I can be the term that can represent interference (e.g., interference on the received signal).

At the receiver (e.g., receiver component of the communication device 104), the receiver can pass the signal through the detector of the communication device 104. Letting h_est be the estimated channel, the received signal can be equalized with the estimated channel, for example, using the following equation:

$$h_{est}^{-1} Y = h_{est}^{-1} hx + h_{est}^{-1} n + h_{est}^{-1} I. \quad \text{(Equation (2))}$$

In some embodiments, the channel estimation error can be modeled, for example, in accordance with the following equation:

$$h_{est} = h + e, \quad \text{(Equation (3))}$$

wherein e can be the channel estimation error. The received signal z after equalization can be, for example, given by the following equation:

$$z = h_{est}^{-1} Y = (h+e)^{-1} hx + (h+e)^{-1} n, \quad \text{(Equation (4))}$$

which can be equal to $$z = x + (e)^{-1} x + h_{est}^{-1} n + h_{est}^{-1} I. \quad \text{(Equation (5))}$$

If the residual interference is represented as W, the received signal z can be $$z = x + W1 + W2, \quad \text{(Equation (6))}$$

wherein W1 can be or represent residual interference, for example, due to, or at least due in part to, thermal noise, and W2 can be or represent the residual interference (for I) of the secondary interference.

With the introduction of the interleaver component 120 (and/or the randomizer component and/or other functionality or features of the RS signal management component 118), with regard to the equation (Equation (6)) above, W2 can be replaced by W3, wherein the variance of W3 can be less (e.g., always can be less) than W2. This can be because the resource elements of reference signals can be randomized in the adjacent cells such that the probability of a reference signal interfering with the data/reference signal of the other cell can be reduced or minimized. This can thereby reduce the channel estimation error, and, as a result, the performance of the system 100 can be improved.

In some embodiments, the interleaver component 120 can be applied at the resource element level. In other embodiments, the interleaver component 120 (e.g., the interleaving pattern of the interleaver component 120) can be applied at the group of resource elements as part of VRB-to-PRB mapping, for example, in a manner that can be similar to performing VRB-to-PRB mapping of data. In still other embodiments, the interleaving pattern (e.g., the interleaving pattern of the interleaver component 120) of each antenna port can be different such that enhanced (e.g., maximum, optimal, or suitable) diversity gain can be obtained for reference signals.

The disclosed subject matter, employing the techniques, methods, and systems disclosed herein, can reduce, eliminate or at least substantially eliminate, and/or randomize the interference on reference signals from other co-channel reference signals. Such reduction, elimination or at least substantial elimination, and/or randomization in or of the interference on reference signals from other co-channel reference signals can thereby improve the channel estimation performance for CSI estimation and data detection by the communication device 104. As a result, the disclosed subject matter can achieve significant gains in link and system throughputs.

Figure 8:
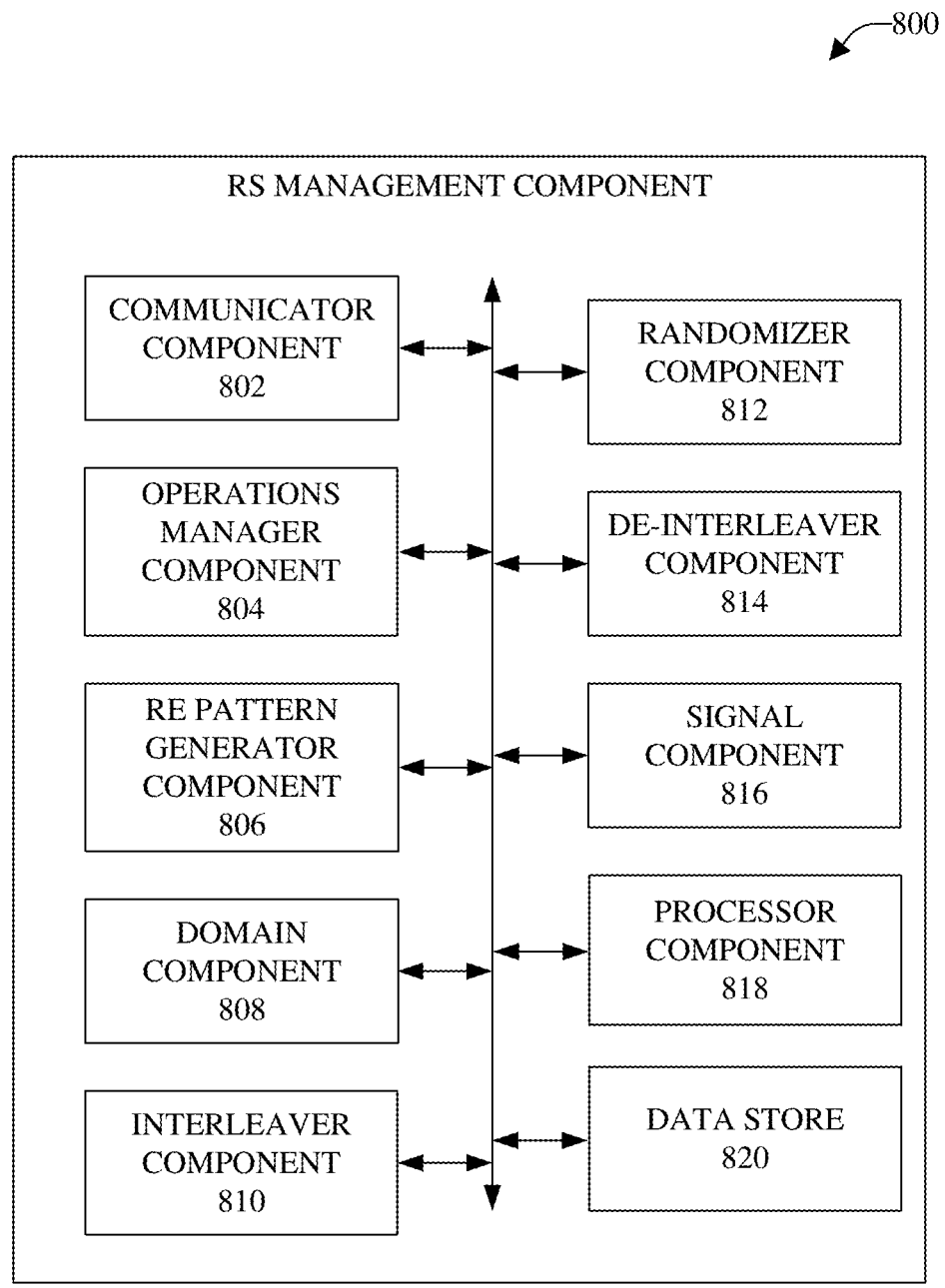
FIG. 8 depicts a block diagram of an example, non-limiting reference signal (RS) management component, in accordance with various aspects and embodiments of the disclosed subject matter.

FIG. 8 depicts a block diagram of an example, non-limiting RS management component 800, in accordance with various aspects and embodiments of the disclosed subject matter. The RS management component 800 can comprise a communicator component 802 that can communicate or facilitate communication of information to other devices (e.g., communication device, another RS management component, a network node device, . . . ), and can receive or facilitate receiving information from other devices.

The RS management component 800 can include an operations manager component 804 that can control (e.g., manage) operations associated with the RS management component 800. For example, the operations manager component 804 can facilitate generating instructions to have components of the RS management component 800 perform operations, and can communicate respective instructions to respective components (e.g., communicator component 802, resource element pattern generator component 806, domain component 808, interleaver component 810, randomizer component 812, de-interleaver component 814, signal component 816, . . . ) of the RS management component 800 to facilitate performance of operations by the respective components of the RS management component 800 based at least in part on the instructions, in accordance with the defined reference signal management criteria and the defined reference signal management algorithm(s) (e.g., reference signal management algorithms as disclosed, defined, recited, or indicated herein by the methods, systems, and techniques described herein). The operations manager component 804 also can facilitate controlling data flow between the respective components of the RS management component 800 and controlling data flow between the RS management component 800 and another component(s) or device(s) (e.g., communication device, base station or other network node component or device of the communication network) associated with (e.g., connected to) the RS management component 800.

The RS management component 800 can further comprise a resource element (RE) pattern generator component 806 that can determine and generate resource element patterns to utilize to facilitate communicating reference signals and data to a communication device associated with a cell, in accordance with the defined reference signal management criteria and the defined reference signal management algorithm(s). A resource element pattern can comprise respective locations (e.g., positions) for respective reference signals, and other respective locations for respective data. The resource element pattern generator component 806 can utilize one or more functions, such as, for example, a resource element shifting function, an interleaver function, and/or a randomizing function, to determine, select, shift, and/or adjust (e.g., modify) the respective locations of the resource elements for the reference signals in a resource element pattern for a communication device associated with a cell to enable the locations of the resource elements for the reference signals in the resource element pattern to be different, or at least substantially different, from another resource element pattern that is to be used for another communication device associated with another cell, which can be adjacent to, neighbor, or otherwise be proximately located to the cell associated with the communication device, to facilitate reducing or eliminating interference on the reference signals from other co-channel reference signals (e.g., other reference signals for the other communication device of the other cell).

The RS management component 800 also can include a domain component 808 that can be utilized to facilitate representing information in a desired domain and/or translating or modifying data from one domain (e.g., time) to another domain (e.g., frequency). The resource element pattern generator component 806 can work in conjunction with the domain component 808 to generate resource element patterns in a desired domain for use to facilitate communication of reference signals and data to communication devices. For instance, the resource element pattern generator component 806 can work in conjunction with the domain component 808 to generate a resource element pattern in the time domain, frequency domain, or code domain. In some embodiments, the resource element pattern generator component 806 can work in conjunction with the domain component 808 (and/or the interleaver component 810) to generate a resource element pattern and applying the resource element pattern (e.g., interleaved or non-interleaved resource element pattern) to resource elements (e.g., resource elements for reference signals) at the resource element level, in the resource element domain. In certain embodiments, the resource element pattern generator component 806 can work in conjunction with the domain component 808 (and/or the interleaver component 810) to generate a resource element pattern, by applying the resource element pattern (e.g., interleaved or non-interleaved resource element pattern) to a group of resource elements (e.g., resource elements for reference signals) as part of VRB-to-PRB mapping (e.g., in a manner that can be similar to VRB-to-PRB mapping of data), in the VRB-to-PRB domain.

In some embodiments, the RS management component 800 can employ the interleaver component 810 to interleave resource elements, such as resource elements for reference signals, to facilitate generating a desired resource element pattern (e.g., an interleaved and/or randomized resource element pattern) for use in communicating reference signals and data to a communication device associated with a cell. The interleaver component 810 can be inserted in the coding chain, which can provide frequency diversity, and can provide more diversity gain to the reference symbols (e.g., reference symbols representing reference signals). For example, once the reference symbols are generated and modulated by the network node device (e.g., network node device 110), the interleaver component 810 can be introduced or inserted either in the resource elements level or at the resource block level (e.g., in bundles or groups of resource elements). Due to the introduction of the interleaver component 810, such as described herein, the interference from the other co-channel communication device can be randomized (e.g., by the use of the interleaver component 810 and/or the randomizer component 812), which can thereby reduce or minimize the interference (e.g., the level of interference) on the resource elements allocated for the reference symbols. This can be particularly useful, for example, when the load of the communication network system of other cells is relatively small.

The RS management component 800 also can include the randomizer component 812, which can utilize a randomizing function to facilitate randomly determining locations for resource elements for reference signals in a resource element pattern (e.g., randomized resource element pattern). The resource element pattern generator component 806 can operate in conjunction with the randomizer component 812 to generate a randomized resource element pattern, comprising resource elements (e.g., resource elements for reference signals) in random positions in the resource element grid, based at least in part on the randomizing function and/or one or more seeds, for use in communicating reference signals and data to a communication device associated with a cell. The one or more seeds can comprise or relate to (e.g., be based at least in part on), for example, a time value, a date value, a data value of an item of data, a random seed value, or other type of seed.

In some embodiments, the RS management component 800 can comprise a de-interleaver component 814 that, for an uplink transmission received from a communication device by the network node device, can de-interleave an interleaved pattern of resource elements, based at least in part on a de-interleaving function, to facilitate recovering, decoding, and/or demodulating the reference signals and data in the uplink transmission. The de-interleaving function can correspond to, be a complement of, and/or reverse the interleaving of an interleaving function utilized by the communication device (e.g., interleaver component of an RS management component of the communication device) to interleave the resource elements to form an interleaved resource element pattern. The RS management component 800 can know the interleaving function utilized by the communication device from information regarding the interleaving function received, via a desired signal (e.g., uplink control signal or higher layer signal), by the RS management component 800 from the communication device.

The RS management component 800 can include a signal component 816 that can generate signals and facilitate communication (e.g., via the communicator component 802) of the signals to communication devices or other desired destinations (e.g., network node devices. For example, the signal component can generate a signal that can include information regarding a resource element pattern used to communicate reference signals and data, interleaving (if any) and/or randomization (if any) of resource elements (e.g., locations of resource elements) that was performed in connection with generating the resource element pattern. The signal can be, for example, an RRC signal, a signal (e.g., dynamic signal) that uses DCI, a MAC signal, or other higher layer signal.

The RS management component 800 also can comprise a processor component 818 can work in conjunction with the other components (e.g., communicator component 802, operations manager component 804, resource element pattern generator component 806, domain component 808, interleaver component 810, randomizer component 812, de-interleaver component 814, signal component 816, and data store 820) to facilitate performing the various functions of the RS management component 800. The processor component 818 can employ one or more processors, microprocessors, or controllers that can process data, such as information relating to communication devices (e.g., UEs), control channels, control channel formats, control channel information, CSI, parameters relating to data communications, reference signals, resource element patterns, interleaving, interleaving patterns, interleaving functions, randomization (e.g., randomizing of locations of resource elements in a resource element pattern), randomizing functions, de-interleaving, de-interleaving patterns, de-interleaving functions, domains (e.g., time domain, frequency domain, code domain, . . . ), signaling, reference signal management criteria, traffic flows, policies, algorithms (e.g., reference signal management algorithm(s), interleaving algorithm(s), randomization algorithm(s), de-interleaving algorithm(s), mapping algorithm(s), . . . ), protocols, interfaces, tools, and/or other information, to facilitate operation of the RS management component 800, as more fully disclosed herein, and control data flow between the RS management component 800 and other components (e.g., mobile devices (e.g., communication device), other network devices (e.g., network node devices) of the communication network, data sources, applications, . . . ) associated with the RS management component 800.

The data store 820 can store data structures (e.g., user data, metadata), code structure(s) (e.g., modules, objects, hashes, classes, procedures) or instructions, information relating to communication devices (e.g., UEs), control channels, control channel formats, control channel information, CSI, parameters relating to data communications, reference signals, resource element patterns, interleaving, interleaving patterns, interleaving functions, randomization (e.g., randomizing of locations of resource elements in a resource element pattern), randomizing functions, de-interleaving, de-interleaving patterns, de-interleaving functions, domains (e.g., time domain, frequency domain, code domain, . . . ), signaling, reference signal management criteria, traffic flows, policies, algorithms (e.g., reference signal management algorithm(s), interleaving algorithm(s), randomization algorithm(s), de-interleaving algorithm(s), mapping algorithm(s), . . . ), protocols, interfaces, tools, and/or other information, to facilitate controlling operations associated with the RS management component 800. In an aspect, the processor component 818 can be functionally coupled (e.g., through a memory bus) to the data store 820 in order to store and retrieve information desired to operate and/or confer functionality, at least in part, to the communicator component 802, operations manager component 804, resource element pattern generator component 806, domain component 808, interleaver component 810, randomizer component 812, de-interleaver component 814, signal component 816, and data store 820, etc., and/or substantially any other operational aspects of the RS management component 800.

It should be appreciated that the data store 820 described herein can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
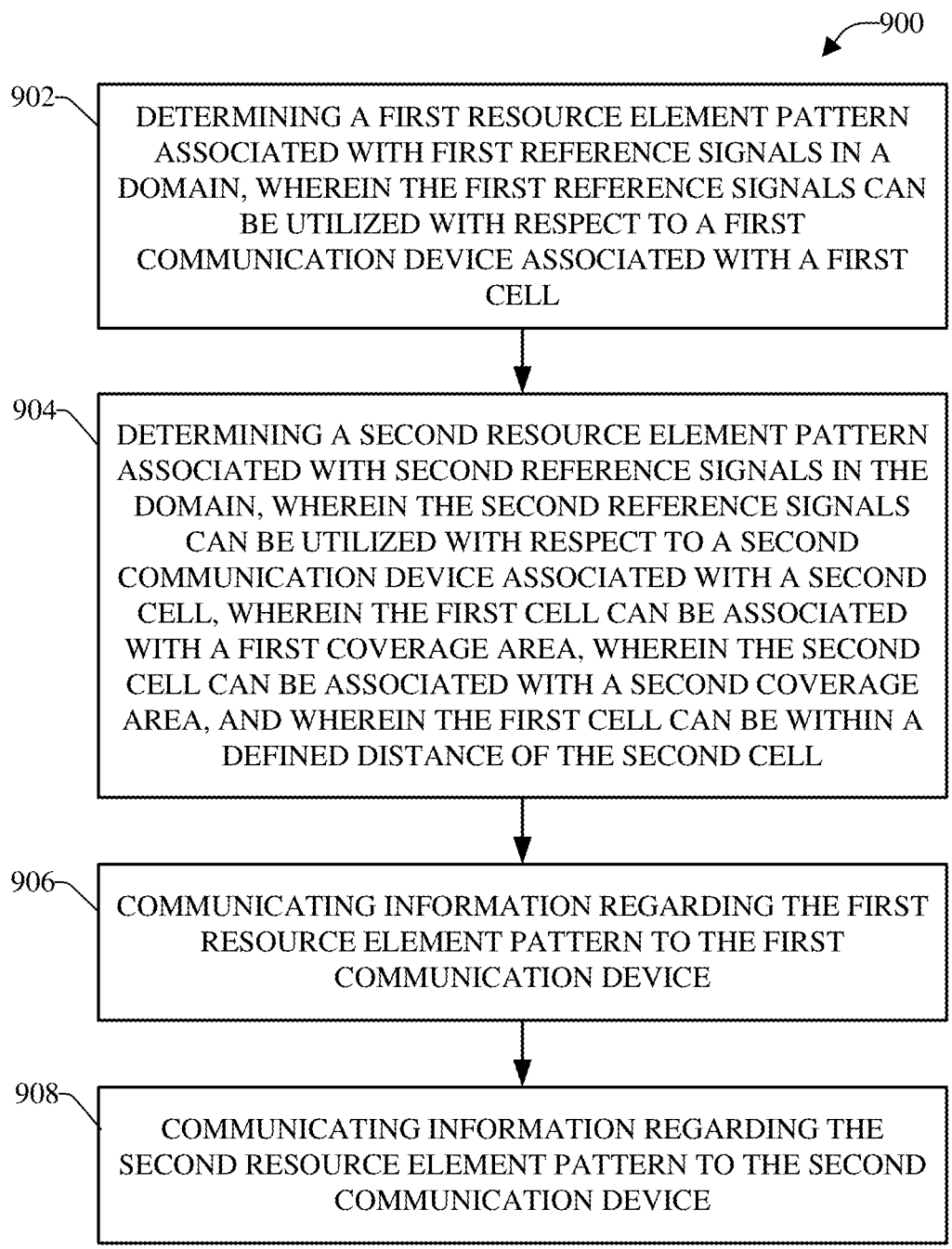
FIG. 9 illustrates a flow diagram of an example, non-limiting method that can manage reference signals associated with a communication device, which can be associated with a cell, to facilitate reducing interference on the reference signals from other co-channel reference signals, in accordance with various aspects and embodiments of the disclosed subject matter.
Figure 10:
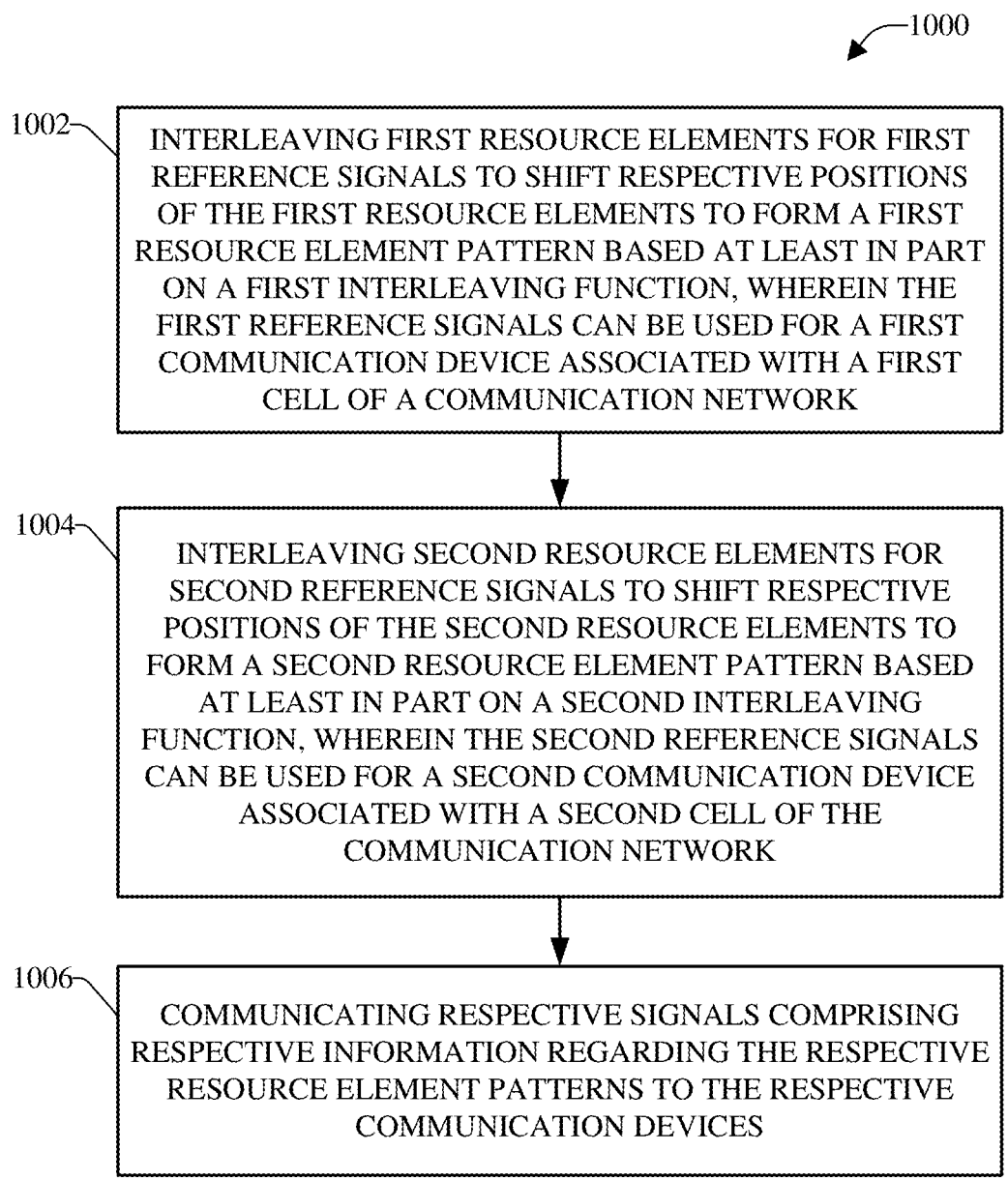
FIG. 10 depicts a flow diagram of an example, non-limiting method that can facilitate managing reference signals associated with a communication device, which can be associated with a cell, by interleaving at the resource elements level or resource block level to facilitate reducing interference on the reference signals from other co-channel reference signals, in accordance with various aspects and embodiments of the disclosed subject matter.
Figure 11:
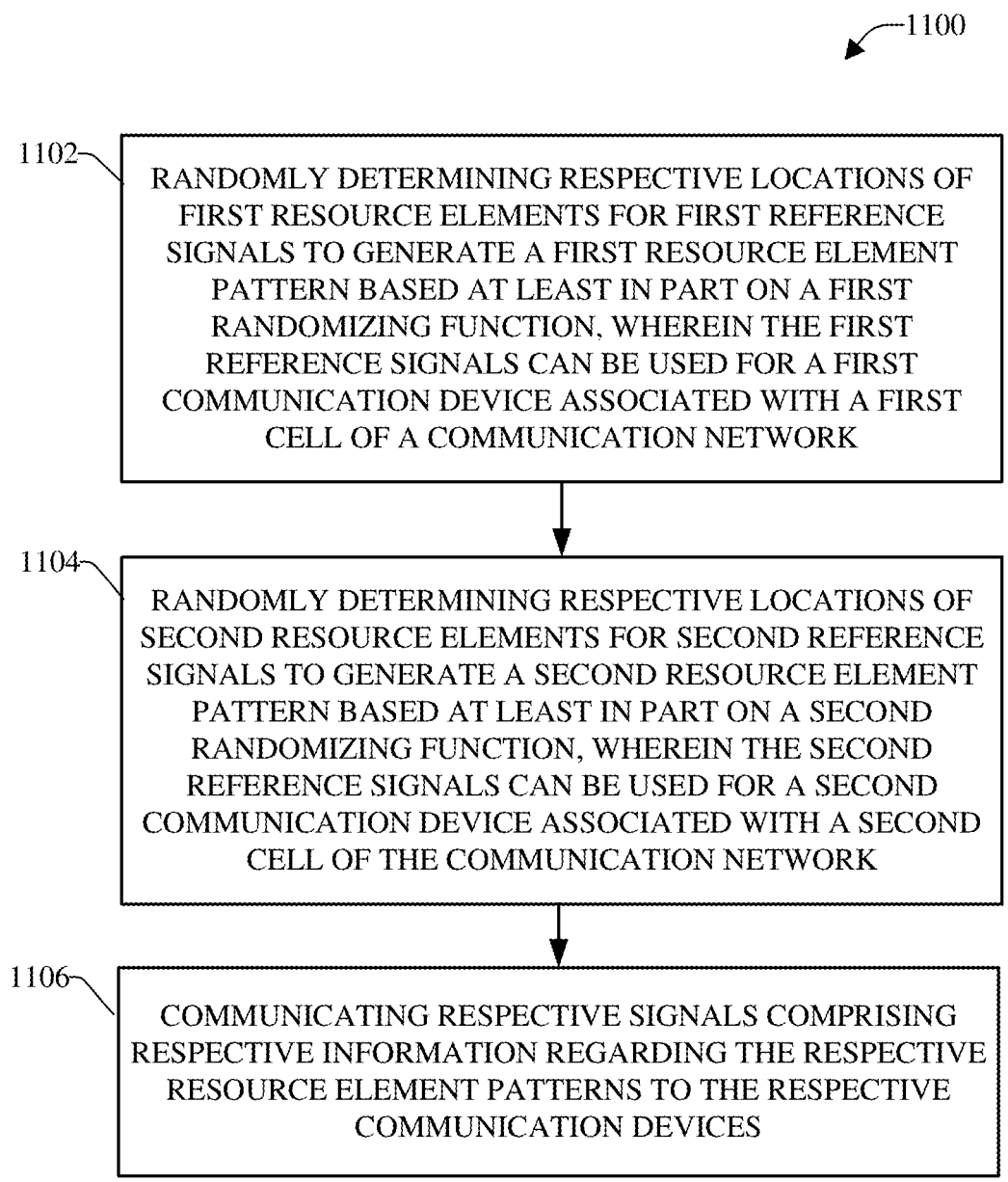
FIG. 11 illustrates a flow diagram of an example, non-limiting method that can facilitate managing reference signals associated with communication devices, which can be associated with a cell, by randomly determining resource element patterns for respective communication devices associated with respective cells to facilitate reducing interference on reference signals of a communication device from other co-channel reference signals, in accordance with various aspects and embodiments of the disclosed subject matter.

In view of the example systems and/or devices described herein, example methods that can be implemented in accordance with the disclosed subject matter can be further appreciated with reference to flowchart in FIGS. 9-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 9 illustrates a flow diagram of an example, non-limiting method 900 that can manage reference signals associated with a communication device, which can be associated with a cell, to facilitate reducing interference on the reference signals from other co-channel reference signals (e.g., associated with another communication device(s) associated with another cell(s) (e.g., neighbor or adjacent cell)), in accordance with various aspects and embodiments of the disclosed subject matter. The method 900 can be implemented by a network node device of a wireless communication network, wherein the network node device can comprise a processor, a memory, an RS management component, and/or an interleaver component (e.g., an adaptive interleaver). Alternatively, or additionally, a machine-readable storage medium can comprise executable instructions that, when executed by a processor, facilitate performance of operations for the method 900.

At 902, a first resource element pattern associated with first reference signals in a domain can be determined, wherein the first reference signals can be utilized with respect to a first communication device associated with a first cell. The RS management component can determine the first resource element pattern associated with (e.g., for use in the transmission of) the first reference signals for use with respect to the first communication device associated with the first cell to communicate the first reference signals and data to the first communication device (e.g., during a downlink transmission from a network node device (e.g., base station) to the first communication device). The RS management component can determine the first resource element pattern for or in the time domain, frequency domain, code domain, resource element domain, and/or VRB-to-PRB domain.

At 904, a second resource element pattern associated with second reference signals in the domain can be determined, wherein the second reference signals can be utilized with respect to a second communication device associated with a second cell, wherein the first cell can be associated with a first coverage area, wherein the second cell can be associated with a second coverage area, and wherein the first cell can be within a defined distance of the second cell (e.g., the first cell can neighbor, can be adjacent to, can overlap, and/or can otherwise be proximately located to the second cell). The RS management component (or another RS management component associated with the second cell) can determine the second resource element pattern associated with the second reference signals for use with respect to the second communication device associated with the second cell to communicate the second reference signals and data to the second communication device (e.g., during a downlink transmission from a network node device (e.g., base station) to the second communication device). The RS management component (or the other RS management component) can determine the second resource element pattern for or in the time domain, frequency domain, code domain, resource element domain, and/or VRB-to-PRB domain.

At 906, information regarding the first resource element pattern can be communicated to the first communication device. The RS management component can communicate the regarding the first resource element pattern to the first communication device to inform the first communication device about the structure (e.g., formation, configuration) of the first resource element pattern, including the respective locations, in the first resource element pattern, of the resource elements that contain the first reference signals, so that the first communication device can know where the first reference signals are located within the first resource element pattern. The RS management component can communicate the information regarding the first resource element pattern to the first communication device via an RRC signal, a signal (e.g., dynamic signaling) using DCI, or other desired (e.g., higher layer) signal (e.g., MAC signal, or a signal associated with a physical layer).

At 908, information regarding the second resource element pattern can be communicated to the second communication device. The RS management component (or another RS management component associated with the second cell) can communicate the regarding the second resource element pattern to the second communication device to inform the second communication device about the structure (e.g., formation, configuration) of the second resource element pattern, including the respective locations, in the second resource element pattern, of the resource elements that contain the second reference signals, so that the second communication device can know where the second reference signals are located within the second resource element pattern. The RS management component can communicate the information regarding the second resource element pattern to the second communication device via an RRC signal, a signal (e.g., dynamic signaling) using DCI, or another desired signal.

FIG. 10 depicts a flow diagram of an example, non-limiting method 1000 that can facilitate managing reference signals associated with a communication device, which can be associated with a cell, by interleaving at the resource elements level or resource block level (e.g., in bundles of resource elements) to facilitate reducing interference on the reference signals from other co-channel reference signals (e.g., associated with another communication device(s) associated with another cell(s) (e.g., neighbor or adjacent cell)), in accordance with various aspects and embodiments of the disclosed subject matter. The method 1000 can be implemented by a network node device of a wireless communication network, wherein the network node device can comprise a processor, a memory, an RS management component, and/or an interleaver component (e.g., an adaptive interleaver). Alternatively, or additionally, a machine-readable storage medium can comprise executable instructions that, when executed by a processor, facilitate performance of operations for the method 1000.

At 1002, first resource elements for first reference signals can be interleaved to shift respective positions of the first resource elements to form a first resource element pattern based at least in part on a first interleaving function, wherein the first reference signals can be used for a first communication device associated with a first cell of a communication network. The RS management component can employ the interleaver component to interleave the first resource elements for the first reference signals to shift or change (e.g., alter) the respective positions of the first resource elements to form the first resource element pattern (e.g., first interleaved resource element pattern), based at least in part on the first interleaving function.

At 1004, second resource elements for second reference signals can be interleaved to shift respective positions of the second resource elements to form a second resource element pattern based at least in part on a second interleaving function, wherein the second reference signals can be used for a second communication device associated with a second cell of the communication network. The second cell can be a neighbor of, adjacent to, or otherwise proximately located to the first cell in the communication network. The RS management component (or another RS management component associated with the second cell) can employ the interleaver component (or another interleaver component) to interleave the second resource elements for the second reference signals to shift or change (e.g., alter) the respective positions of the second resource elements to form the second resource element pattern (e.g., first interleaved resource element pattern), based at least in part on the second interleaving function. The second interleaving function can be different from the first interleaving function, and the second resource element pattern can be different from the first resource element pattern. For instance, the first interleaving function can facilitate shifting the first resource elements by a first amount, and the second interleaving function can facilitate shifting the second resource elements by a second (e.g., different) amount.

It is to be appreciated and understood that, while, at 1004, interleaving of the second resource elements to form the second resource pattern with respect to the second communication device associated with the second cell is described, in other embodiments, determining or generating the second resource pattern can be performed without interleaving the second resource elements to form the second resource pattern. For instance, the interleaving of the first resource elements to form the first resource pattern with respect to the first communication device (e.g., as described at reference numeral 1002) can be performed, while determining or generating the second resource pattern can be performed without interleaving the second resource elements to form the second resource pattern.

At 1006, respective signals comprising respective information regarding the respective resource element patterns can be communicated to the respective communication devices. For instance, the RS management component can communicate a first signal comprising information regarding the first resource element pattern to the first communication device. The RS management component (or another RS management component associated with the second cell) can communicate a second signal comprising information regarding the second resource element pattern to the second communication device. The respective signals can respectively be an RRC signal, a signal using DCI (e.g., dynamic signaling), or another desired (e.g., higher layer) signal (e.g., a MAC signal, or a signal associated with a physical layer).

FIG. 11 illustrates a flow diagram of an example, non-limiting method 1100 that can facilitate managing reference signals associated with communication devices, which can be associated with a cell, by randomly determining resource element patterns for respective communication devices associated with respective cells to facilitate reducing interference on reference signals of a communication device from other co-channel reference signals (e.g., associated with another communication device(s) associated with another cell(s) (e.g., neighbor or adjacent cell)), in accordance with various aspects and embodiments of the disclosed subject matter. The method 1100 can be implemented by a network node device of a wireless communication network, wherein the network node device can comprise a processor, a memory, an RS management component, and/or an interleaver component (e.g., an adaptive interleaver). Alternatively, or additionally, a machine-readable storage medium can comprise executable instructions that, when executed by a processor, facilitate performance of operations for the method 1100.

At 1102, respective locations of first resource elements for first reference signals can be randomly determined to generate a first resource element pattern based at least in part on a first randomizing function, wherein the first reference signals can be used for a first communication device associated with a first cell of a communication network. The RS management component (e.g., employing a randomizer component) can randomly determine the respective locations (e.g., positions) of the first resource elements for the first reference signals to generate the first resource element pattern, based at least in part on the first randomizing function. In some embodiments, the RS management component can utilize the interleaver component, along with the first randomizing function, to facilitate randomly determining the respective locations of the first resource elements for the first reference signals to generate the first resource element pattern.

At 1104, respective locations of second resource elements for second reference signals can be randomly determined to generate a second resource element pattern based at least in part on a second randomizing function, wherein the second reference signals can be used for a second communication device associated with a second cell of the communication network. The second cell can be a neighbor of, adjacent to, or otherwise proximately located to the first cell in the communication network. The RS management component (or another RS management component associated with the second cell) can, for example, employ a randomizer component to randomly determine the respective locations of the second resource elements for the second reference signals to generate the second resource element pattern, based at least in part on the second randomizing function. In some embodiments, the RS management component (or the other RS management component) can utilize the interleaver component (or another interleaver component), along with the second randomizing function, to facilitate randomly determining the respective locations of the second resource elements for the second reference signals to generate the second resource element pattern.

It is to be appreciated and understood that, while, at 1104, randomly determining respective locations of the second resource elements to form the second resource element pattern with respect to the second communication device associated with the second cell is described, in other embodiments, determining or generating the second resource element pattern can be performed without randomly determining the respective locations of the second resource elements in the second resource element pattern to form the second resource element pattern. For instance, the random determination of the respective locations of the first resource elements to generate the first resource pattern with respect to the first communication device (e.g., as described at reference numeral 1102) can be performed, while determining or generating the second resource pattern can be performed without randomly determining the respective locations of the second resource elements to generate the second resource element pattern.

At 1106, respective signals comprising respective information regarding the respective resource element patterns can be communicated to the respective communication devices. For instance, the RS management component can communicate a first signal comprising information regarding the first resource element pattern (e.g., first randomized resource element pattern) to the first communication device. The RS management component (or another RS management component associated with the second cell) can communicate a second signal comprising information regarding the second resource element pattern (e.g., second randomized resource element pattern) to the second communication device. The respective signals can respectively be an RRC signal, a signal using DCI (e.g., dynamic signaling), or another desired (e.g., higher layer) signal (e.g., a MAC signal, or a signal associated with a physical layer).

Described herein are systems, methods, articles of manufacture, and other embodiments or implementations that can facilitate controlling or reducing interference on reference signals from other co-channel reference signals, and improving channel estimation performance for CSI estimation and data detection by a UE, in a communication network. Facilitating controlling or reducing interference on reference signals from other co-channel reference signals, and improving channel estimation performance for CSI estimation and data detection by a UE, in a communication network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 12:
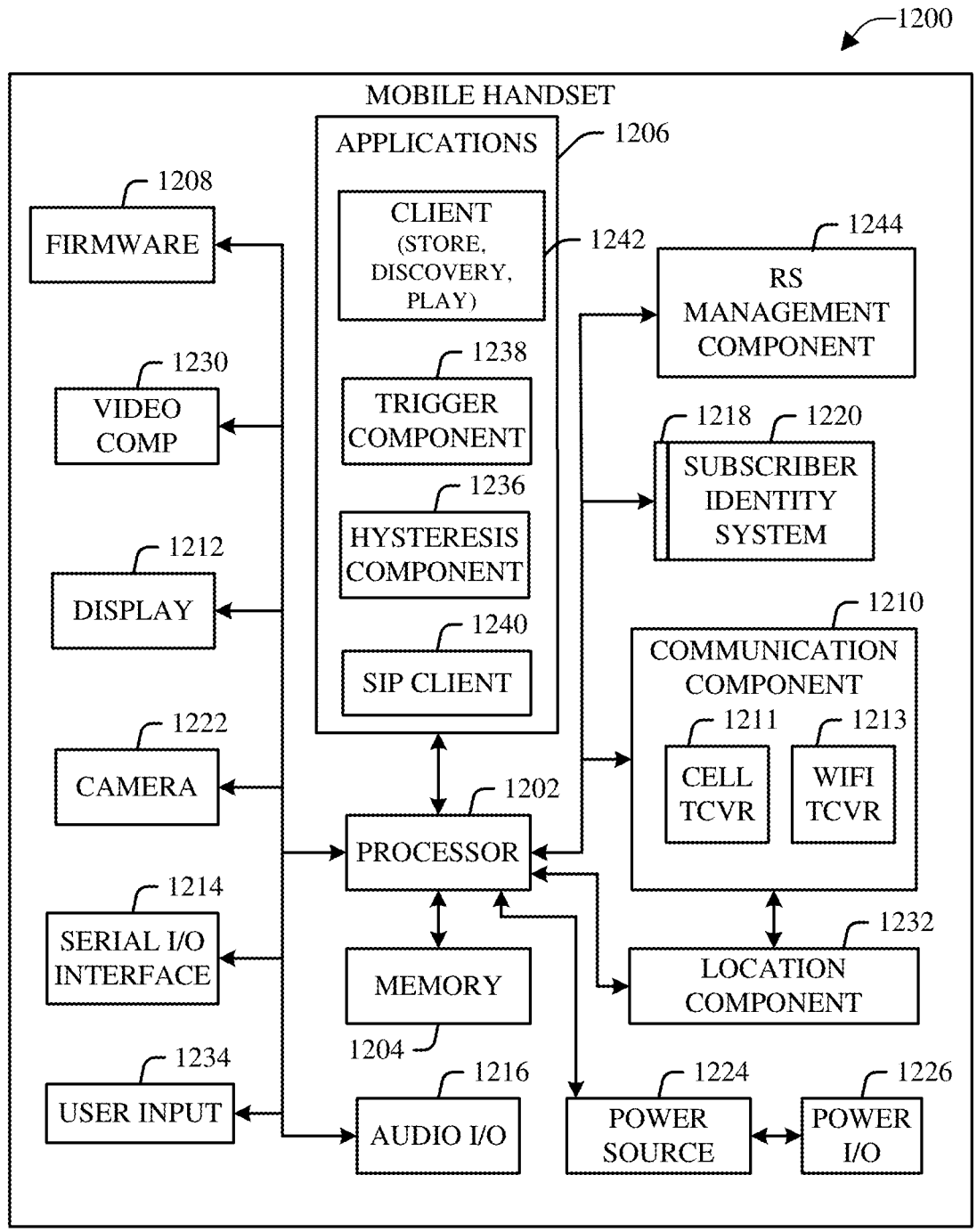
FIG. 12 depicts an example block diagram of an example mobile handset operable to engage in a system architecture that facilitates wireless communications according to one or more embodiments described herein.

Referring now to FIG. 12, depicted is an example block diagram of an example mobile handset 1200 (e.g., mobile communication device) operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 can include a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communication component 1210 interfaces to the processor 1202 to facilitate wired/wireless communication with external systems, e.g., cellular networks, VoIP networks, and so on. Here, the communication component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communication component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communication component 1210, includes an indoor network radio transceiver 1213 (e.g., Wi-Fi transceiver). This function supports the indoor radio link, such as IEEE 802.11, for the dual-mode GSM handset (e.g., handset 1200). The handset 1200 can accommodate at least satellite radio services through a handset that can combine wireless voice and digital radio chipsets into a single handheld device.

In some embodiments, the handset 1200 can comprise an RS management component 1244 that can be the same as or similar to, and/or can comprise the same or similar functionality and components as, the RS management component (e.g., RS management component 118), as more fully described herein. The RS management component 1244 can be employed to determine and use desirable resource element patterns (e.g., desirable interleaved resource element patterns and/or otherwise particular (e.g., different and/or random) resource element patterns) to facilitate communicating reference signal information and data to a network node device (e.g., base station), for example, during uplink transmission, to facilitate reducing or eliminating interference (e.g., co-channel interference) between the cell associated with the mobile handset 1200 and another cell (e.g., adjacent or neighbor cell) and associated communication device. The RS management component 1244 also can communicate and coordinate with the RS management component (e.g., 118) and/or associated network node device (e.g., 110) to determine or identify which resource element pattern is to be employed at a given time or for a given data communication.

Figure 13:
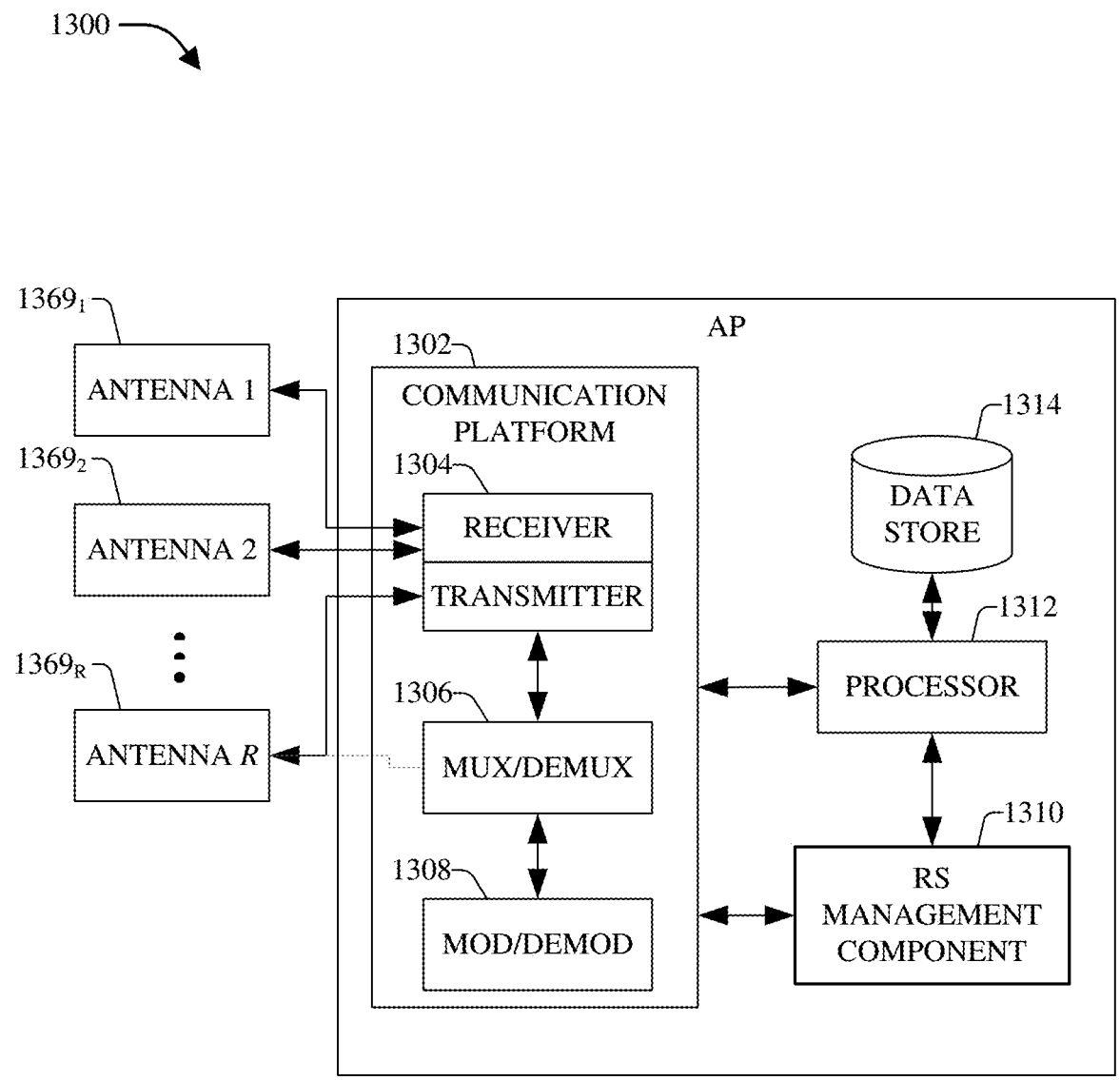
FIG. 13 illustrates a block diagram of an example access point, in accordance with various aspects and embodiments of the disclosed subject matter.

FIG. 13 illustrates a block diagram of an example AP 1300 (e.g., macro base station, femto AP, pico AP, Wi-Fi AP, Wi-Fi-direct AP, . . . ), in accordance with various aspects and embodiments of the disclosed subject matter. The AP 1300 can receive and transmit signal(s) from and to wireless devices like access points (e.g., base stations, femtocells, picocells, . . . ), access terminals (e.g., UEs), wireless ports and routers, and the like, through a set of antennas $1369_1$-$1369_R$. In an aspect, the antennas $1369_1$-$1369_R$ are a part of a communication platform 1302, which comprises electronic components and associated circuitry that can provide for processing and manipulation of received signal(s) and signal(s) to be transmitted. In an aspect, the communication platform 1302 can include a receiver/transmitter 1304 that can convert signal from analog to digital upon reception, and from digital to analog upon transmission. In addition, receiver/transmitter 1304 can divide a single data stream into multiple, parallel data streams, or perform the reciprocal operation.

In an aspect, coupled to receiver/transmitter 1304 can be a multiplexer/demultiplexer (mux/demux) 1306 that can facilitate manipulation of signal in time and frequency space. The mux/demux 1306 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1306 can scramble and spread information (e.g., codes) according to substantially any code known in the art, e.g., Hadamard-Walsh codes, Baker codes, Kasami codes, polyphase codes, and so on. A modulator/demodulator (mod/demod) 1308 also can be part of the communication platform 1302, and can modulate information according to multiple modulation techniques, such as frequency modulation, amplitude modulation (e.g., M-ary quadrature amplitude modulation (QAM), with M a positive integer), phase-shift keying (PSK), and the like.

In some embodiments, the AP 1300 can include an RS management component 1310 that can be the same as or similar to, and/or can comprise the same or similar functionality and components as, the RS management component (e.g., RS management component 118), as more fully described herein. The RS management component 1310 can be employed to determine and use desirable resource element patterns (e.g., desirable interleaved resource element patterns and/or otherwise particular (e.g., different and/or random) resource element patterns) to facilitate communicating reference signals and data to a communication device (e.g., UE), for example, during downlink transmission, to facilitate reducing or eliminating interference (e.g., co-channel interference) between the cell associated with the communication device and another cell (e.g., adjacent or neighbor cell). The RS management component 1310 also can communicate and coordinate with another RS management component and/or associated network node device (e.g., 112) to facilitate determining or identifying which resource element pattern is to be employed at a given time or for a given communication of data and reference signals for the communication device.

The AP 1300 also can comprise a processor(s) 1312 that can be configured to confer and/or facilitate providing functionality, at least partially, to substantially any electronic component in or associated with the AP 1300. For instance, the processor(s) 1312 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 1312 also can facilitate other operations on data, for example, to facilitate managing reference signals associated with communication devices, managing the determination and generation of resource element patterns for use in communicating reference signals and data to communication devices, managing interleaving and/or randomizing associated with locations of resource elements for reference signals in connection with determining or generating resource element patterns, adjustment of parameters associated with managing reference signals and the determination and generation of resource element patterns, etc.

In another aspect, the AP 1300 can include a data store 1314 that can store data structures; code instructions; rate coding information; information relating to measurement of radio link quality or reception of information related thereto; information relating to communication devices (e.g., UEs), control channels, control channel formats, control channel information, CSI, parameters relating to data communications, reference signals, resource element patterns, interleaving, interleaving patterns, interleaving functions, randomization (e.g., randomizing of locations of resource elements in a resource element pattern), randomizing functions, de-interleaving, de-interleaving patterns, de-interleaving functions, domains (e.g., time domain, frequency domain, code domain, . . . ), signaling, reference signal management criteria, traffic flows, policies, algorithms (e.g., reference signal management algorithm(s), interleaving algorithm(s), randomization algorithm(s), de-interleaving algorithm(s), mapping algorithm(s), . . . ); white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1312 can be coupled to the data store 1314 in order to store and retrieve information (e.g., information, such as algorithms, relating to multiplexing/demultiplexing or modulation/demodulation; information relating to radio link levels; information relating to establishing communication connections associated with a communication device(s) served by the AP 1300; information relating to managing reference signals associated with communication devices, managing the determination and generation of resource element patterns for use in communicating reference signals and data to communication devices, managing interleaving and/or randomizing associated with locations of resource elements for reference signals in connection with determining or generating resource element patterns, adjustment of parameters associated with managing reference signals and the determination and generation of resource element patterns; . . . ) desired to operate and/or confer functionality to the communication platform 1302, the RS management component 1310, and/or other operational components of AP 1300.

Figure 14:
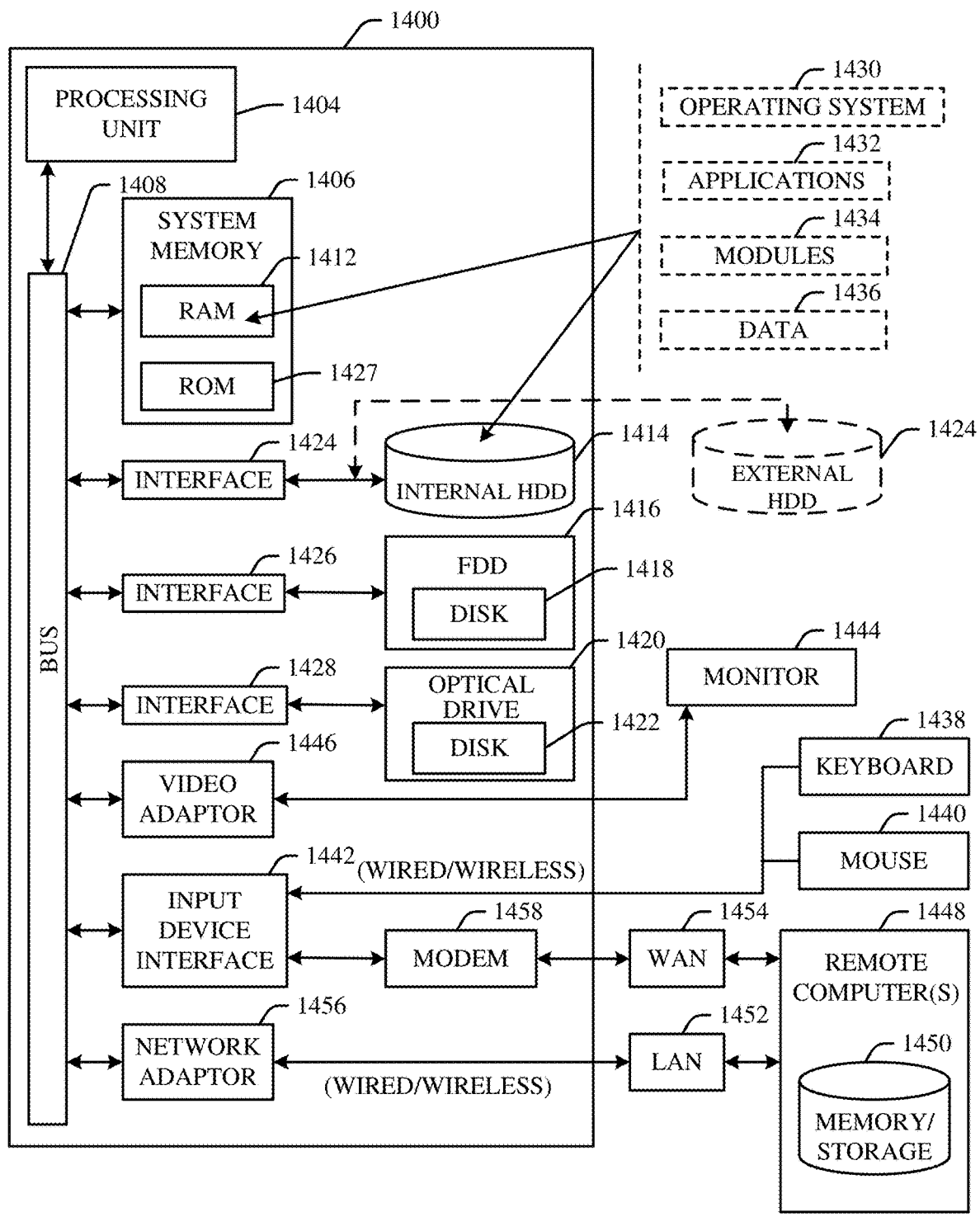
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the disclosed subject matter can be implemented to facilitate controlling or reducing interference on reference signals from other co-channel reference signals, and improving channel estimation performance for CSI estimation and data detection by a UE, in a communication network. While the description above is in the general context of computer-executable instructions that can run on one or more computers, those skilled in the art will recognize that the disclosed subject also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that can be linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
  a processor; and
  a memory that stores executable instructions that, when executed by the processor, facilitate performance of operations, comprising:
    determining a first resource element arrangement for a first reference signal in a domain, wherein the first reference signal is utilized for a first device associated with a first cell device, and wherein a first position of a first resource element associated with the first reference signal is shifted by a first amount, in accordance with the first resource element arrangement; and
    determining a second resource element arrangement for a second reference signal in the domain, wherein the second reference signal is utilized for a second device associated with a second cell device, wherein a second position of a second resource element associated with the second reference signal is shifted by a second amount, in accordance with the second resource element arrangement, wherein the second amount is different from the first amount, and wherein a first cell coverage area of the first cell device is proximately located to a second cell coverage area of the second cell device.

2. The system of claim 1, wherein the domain is one domain of a group of domains comprising a time domain, a frequency domain, and a code domain.

3. The system of claim 1, wherein the operations further comprise:
  inserting the first resource element in the first position of a first resource element structure of first resource elements comprising the first resource element, in accordance with the first resource element arrangement; and
  inserting the second resource element in the second position of a second resource element structure of second resource elements comprising the second resource element, in accordance with the second resource element arrangement, wherein the first position in the first resource element structure is a different position from the second position in the second resource element structure.

4. The system of claim 1, wherein the operations further comprise:
  shifting the first position of the first resource element by the first amount to facilitate forming a first resource element structure of first resource elements comprising the first resource element, in accordance with the first resource element arrangement; and
  shifting the second position of the second resource element by the second amount to facilitate forming a second resource element structure of second resource elements comprising the second resource element, in accordance with the second resource element arrangement.

5. The system of claim 1, wherein the operations further comprise:
  performing first interleaving on first resource elements, comprising the first resource element, to generate a first resource element structure of the first resource elements, in accordance with the first resource element arrangement; and
  performing second interleaving on second resource elements, comprising the second resource element, to generate a second resource element structure of the second resource elements, in accordance with the second resource element arrangement, wherein the second interleaving is different from the first interleaving.

6. The system of claim 1, wherein the operations further comprise:
  determining respective first random locations of respective first resource elements comprising the first resource element, in the first resource element arrangement based on a first randomization function; and
  determining respective second random locations of respective second resource elements comprising the second resource element, in the second resource element arrangement based on a second randomization function.

7. The system of claim 1, wherein the operations further comprise:
  communicating reference signal information relating to the first resource element arrangement for the first reference signal to the first device.

8. The system of claim 7, wherein the communicating the reference signal information comprises communicating the reference signal information to the first device via at least one signal of a group of signals comprising a radio resource control signal, a downlink control signal communicated as part of downlink control information, a media access control signal associated with a media access control layer, and a physical layer control signal associated with a physical layer.

9. The system of claim 1, wherein the operations further comprise:
communicating the first reference signal, in accordance with the first resource element arrangement, to the first device; and
communicating the second reference signal, in accordance with the second resource element arrangement, to the second device, wherein interference between at least the first reference signal and the second reference signal is mitigated based on the first resource element arrangement and the second resource element arrangement.

10. A method, comprising:
determining, by a system comprising a processor, a first resource element pattern for a first reference signal that is utilized with respect to a first device associated with a first cell device, wherein a first position of a first resource element associated with the first reference signal is altered by a first amount, in accordance with the first resource element pattern; and
determining, by the system, a resource element pattern for a second reference signal that is utilized with respect to a second device associated with a second cell device, wherein a second position of a second resource element associated with the second reference signal is altered by a second amount, in accordance with the second resource element pattern, wherein the second amount is different from the first amount, wherein the first cell device is associated with a first cell coverage area, wherein the second cell device is associated with a second cell coverage area, and wherein the first cell device is within a defined distance of the second cell device.

11. The method of claim 10, wherein the determining the first resource element pattern for the first reference signal comprises determining the first resource element pattern for the first reference signal in a domain, wherein the determining the second resource element pattern for the second reference signal comprises determining the second resource element pattern for the second reference signal in the domain, and wherein the domain is one domain of a group of domains comprising a time domain, a frequency domain, and a code domain.

12. The method of claim 10, further comprising:
determining, by the system, the first position for the first resource element in a first resource element structure of first resource elements comprising the first resource element, in accordance with the first resource element pattern; and
determining, by the system, the second position for the second resource element in a second resource element structure of second resource elements comprising the second resource element, in accordance with the second resource element pattern.

13. The method of claim 10, further comprising:
altering, by the system, the first position of the first resource element by the first amount to facilitate forming a first resource element structure of first resource elements comprising the first resource element, in accordance with the first resource element pattern; and
altering, by the system, the second position of the second resource element by the second amount to facilitate forming a second resource element structure of second resource elements comprising the second resource element, in accordance with the second resource element pattern.

14. The method of claim 10, further comprising:
performing, by the system, first interleaving on first resource elements, comprising the first resource element, to generate a first resource element structure based on the first resource element pattern; and
performing, by the system, second interleaving on second resource elements, comprising the second resource element, to generate a second resource element structure based on the second resource element pattern, wherein the second interleaving is different from the first interleaving.

15. The method of claim 10, further comprising:
determining, by the system, respective first random positions of respective first resource elements, comprising the first resource element, in the first resource element pattern based on a first randomizing function; and
determining, by the system, respective second random positions of respective second resource elements, comprising the second resource element, in the second resource element pattern based on a second randomizing function.

16. The method of claim 10, further comprising:
transmitting, by the system, reference signal information relating to the first resource element pattern associated with the first reference signal to the first device.

17. The method of claim 16, wherein the transmitting the reference signal information comprises transmitting the reference signal information to the first device via at least one signal of a group of signals comprising a radio resource control signal, a downlink control signal communicated as part of downlink control information, a media access control signal associated with a media access control layer, and a physical layer control signal associated with a physical layer.

18. The method of claim 10, further comprising:
transmitting, by the system, the first reference signal, in accordance with the first resource element pattern, to the first device; and
transmitting, by the system, the second reference signal, in accordance with the second resource element pattern, to the second device, wherein interference between at least the first reference signal and the second reference signal is reduced based on the first resource element pattern and the second resource element pattern.

19. A non-transitory machine-readable storage medium, comprising executable instructions that, when executed by a processor, facilitate performance of operations, comprising:
determining a first resource element formation for a first reference signal that is utilized for a first communication device associated with a first cell device, wherein a first position of a first resource element associated with the first reference signal is adjusted by a first amount, in accordance with the first resource element formation; and
determining a second resource element formation for a second reference signal that is utilized for a second communication device associated with a second cell device, wherein a second position of a second resource element associated with the second reference signal is adjusted by a second amount, in accordance with the second resource element formation, wherein the second amount is different from the first amount, wherein the first cell device is associated with a first cell coverage area, wherein the second cell device is associated with a second cell coverage area, and wherein the first cell coverage area and the second cell coverage area are located within a same geographic region.

20. The non-transitory machine-readable storage medium of claim 19, wherein the determining the first resource element formation for the first reference signal comprises determining the first resource element formation for the first reference signal in a domain, wherein the determining the second resource element formation for the second reference signal comprises determining the second resource element formation for the second reference signal in the domain, and wherein the domain is one domain of a group of domains comprising a time domain, a frequency domain, and a code domain.

* * * * *